United States Patent
Omiya

(10) Patent No.: US 8,869,057 B2
(45) Date of Patent: Oct. 21, 2014

(54) SERVER DISPLAYING STATUS OF OPERATOR USING SEAT LAYOUT, TERMINAL FOR MANAGER, SYSTEM, AND METHOD

(75) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 1105 days.

(21) Appl. No.: 12/524,853

(22) PCT Filed: Jan. 25, 2008

(86) PCT No.: PCT/JP2008/051050
§ 371 (c)(1),
(2), (4) Date: Jul. 28, 2009

(87) PCT Pub. No.: WO2008/093604
PCT Pub. Date: Aug. 7, 2008

(65) Prior Publication Data
US 2010/0122202 A1    May 13, 2010

(30) Foreign Application Priority Data

Jan. 29, 2007   (JP) ................. 2007-018573

(51) Int. Cl.
*G06F 3/048* (2013.01)
*H04M 3/51* (2006.01)
*H04M 3/42* (2006.01)
*H04M 3/22* (2006.01)

(52) U.S. Cl.
CPC ........ *H04M 3/5175* (2013.01); *H04M 2201/38* (2013.01); *H04M 2201/14* (2013.01); *H04M 3/42221* (2013.01); *H04M 2201/42* (2013.01); *H04M 3/42102* (2013.01); *H04M 3/2281* (2013.01); *H04M 3/42365* (2013.01)
USPC .......................................... 715/771; 379/256

(58) Field of Classification Search
CPC .......... H04M 3/5175; H04M 3/42365; H04M 3/2281; H04M 3/42102; H04M 3/42221; H04M 2201/42; H04M 2201/14; H04M 2201/38
USPC .................................. 715/771, 772; 379/256
See application file for complete search history.

(56) References Cited

U.S. PATENT DOCUMENTS

| | | | |
|---|---|---|---|
| 4,852,001 | A | 7/1989 | Tsushima et al. |
| 5,111,391 | A | 5/1992 | Fields et al. |

(Continued)

FOREIGN PATENT DOCUMENTS

| | | |
|---|---|---|
| JP | 2002-041738 | 2/2002 |
| JP | 2003-122890 | 4/2003 |

(Continued)

OTHER PUBLICATIONS

Jun'ichi Kikuchi, Operator no Shift Kinmu Scheduling o ASP Service de Ohaba ni Koritsuka shita Tokyo Kaijo Anshin Hyakujuban, Computer Telephony, Jan. 20, 2002, vol. 5, No. 2, pp. 52-54, with English Abstract.

(Continued)

*Primary Examiner* — Anil Bhargava
(74) *Attorney, Agent, or Firm* — Knobbe, Martens, Olson & Bear, LLP

(57) ABSTRACT

A server (10) is connected to a terminal (13) for an operator and a terminal (12) for a manager through a network (14), receives operation situation data representing the operation situation of the terminal (13) transmitted from the terminal (13) together with the seat ID, creates display data for displaying an image of the seat layout representing the operation situation different with the type of the received operation situation data according to the seat ID from the layout data read out of a storage unit (120) of the server (10), and transmits the display data to the terminal (12).

19 Claims, 17 Drawing Sheets

(56) References Cited

U.S. PATENT DOCUMENTS

| | | | |
|---|---|---|---|
| 5,164,897 A | 11/1992 | Clark et al. | |
| 5,185,780 A | 2/1993 | Leggett | |
| 5,241,465 A | 8/1993 | Oba et al. | |
| 5,325,292 A | 6/1994 | Crockett | |
| 5,721,770 A | 2/1998 | Kohler | |
| 5,842,182 A | 11/1998 | Bonner et al. | |
| 5,903,641 A | 5/1999 | Tonisson | |
| 6,044,355 A | 3/2000 | Crockett et al. | |
| 6,049,776 A | 4/2000 | Donnelly et al. | |
| 6,052,460 A | 4/2000 | Fisher et al. | |
| 6,466,663 B1 * | 10/2002 | Ravenscroft et al. | 379/265.01 |
| 6,574,605 B1 | 6/2003 | Sanders et al. | |
| 6,823,315 B1 | 11/2004 | Bucci et al. | |
| 6,859,523 B1 * | 2/2005 | Jilk et al. | 379/32.01 |
| 6,970,829 B1 | 11/2005 | Leamon | |
| 6,985,872 B2 | 1/2006 | Benbassat et al. | |
| 7,103,562 B2 | 9/2006 | Kosiba et al. | |
| 7,155,399 B2 | 12/2006 | Andre et al. | |
| 7,233,919 B1 | 6/2007 | Braberg et al. | |
| 7,254,546 B1 | 8/2007 | Andre et al. | |
| 7,499,869 B2 | 3/2009 | Iknoian | |
| 7,660,406 B2 | 2/2010 | Fama et al. | |
| 7,660,407 B2 | 2/2010 | Fama et al. | |
| 7,672,746 B1 | 3/2010 | Hamilton et al. | |
| 7,787,609 B1 | 8/2010 | Flockhart et al. | |
| 7,788,286 B2 | 8/2010 | Nourbakhsh et al. | |
| 7,953,621 B2 | 5/2011 | Fama et al. | |
| 2002/0030582 A1 | 3/2002 | Depp et al. | |
| 2002/0032576 A1 | 3/2002 | Abbott et al. | |
| 2002/0065700 A1 | 5/2002 | Powell et al. | |
| 2002/0175943 A1 * | 11/2002 | Hunt et al. | 345/771 |
| 2002/0184043 A1 | 12/2002 | Lavorgna et al. | |
| 2003/0004799 A1 | 1/2003 | Kish | |
| 2003/0033184 A1 | 2/2003 | Benbassat et al. | |
| 2003/0078798 A1 | 4/2003 | Zaks et al. | |
| 2003/0167193 A1 | 9/2003 | Jones et al. | |
| 2003/0197055 A1 | 10/2003 | Ben-Aissa | |
| 2004/0083116 A1 | 4/2004 | Joyce | |
| 2004/0093256 A1 | 5/2004 | Garcia et al. | |
| 2004/0107133 A1 | 6/2004 | Pantaleo et al. | |
| 2005/0033670 A1 | 2/2005 | Cheng et al. | |
| 2005/0043987 A1 * | 2/2005 | Kumar et al. | 705/11 |
| 2005/0129216 A1 * | 6/2005 | Tsujiuchi | 379/265.09 |
| 2005/0163305 A1 * | 7/2005 | Jerijian et al. | 379/265.06 |
| 2006/0093095 A1 | 5/2006 | Heck et al. | |
| 2007/0127694 A1 * | 6/2007 | Hajj et al. | 379/265.06 |
| 2007/0250370 A1 | 10/2007 | Partridge et al. | |
| 2008/0004934 A1 | 1/2008 | Fama et al. | |
| 2008/0004936 A1 | 1/2008 | Fama et al. | |
| 2008/0043985 A1 | 2/2008 | Fama et al. | |
| 2008/0059277 A1 | 3/2008 | Medina et al. | |
| 2008/0082387 A1 | 4/2008 | Tewari et al. | |
| 2008/0091501 A1 | 4/2008 | Tewari et al. | |
| 2008/0255919 A1 | 10/2008 | Gorder | |
| 2010/0158237 A1 * | 6/2010 | McCormack et al. | 379/265.06 |

FOREIGN PATENT DOCUMENTS

| | | |
|---|---|---|
| JP | 2003-309656 | 10/2003 |
| JP | 2004-246640 | 9/2004 |
| JP | 2005-085204 | 3/2005 |
| JP | 2005-202843 | 7/2005 |
| JP | 2006-059111 | 3/2006 |
| JP | 2006-67308 | 3/2006 |
| JP | 2006-094260 | 4/2006 |
| JP | 2006-172329 | 6/2006 |
| JP | 2006-211395 | 8/2006 |
| WO | WO 2006/097971 | 9/2006 |

OTHER PUBLICATIONS

Ryuji Yajima, Call Center no "Jinzai Kanri" o Jidoka suru Work Force Management no Iryoku, Computer Telephony, Jun. 20, 2000, vol. 3, No. 7, pp. 42-47, with English Abstract.

Best Call Center no Keyword wa "Monitoring" to "Bunsan Shori", Computer Telephony, Oct. 20, 2000, vol. 3, No. 11, pp. 70-77, with Engish abstract.

International Search Report for International Application No. PCT/JP2008/051049 mailed Feb. 19, 2008.

Office Action for U.S. Appl. No. 12/524,851, dated Nov. 28, 2011.

Notice of Reasons for Rejection issued to JP Application No. 2007-018572, mailed Jan. 10, 2012.

* cited by examiner

FIG. 3

OPERATOR IDENTIFICATION TABLE

| SEAT ID | OPERATOR ID | SIGN-ON DATE AND TIME | SIGN-OFF DATE AND TIME |
|---|---|---|---|
| 3000 | a123 | 2006/12/1 9:00:00 | 2006/12/1 18:00:00 |
| 3001-1 | a125 | 2006/12/1 9:00:00 | 2006/12/1 17:00:00 |
| 3002 | a215 | 2006/12/1 9:00:00 | 2006/12/1 17:00:00 |
| 3003-1 | a148 | 2006/12/1 9:00:00 | 2006/12/1 17:00:00 |
| 3003-2 | b042 | 2006/12/1 9:30:00 | 2006/12/1 17:30:00 |
| ... | ... | ... | ... |

FIG. 4

OPERATIONAL STATUS TABLE

| SEAT ID | STATUS |
|---|---|
| 3000 | 4 |
| 3001 | 2 |
| 3002 | 2 |
| 3003 | 0 |
| 3004 | 3 |
| ... | ... |

FIG. 5

LAYOUT TABLE

| SEAT ID | (X,Y) | TASK IDENTIFICATION CODE | START DATE |
|---|---|---|---|
| 3000 | (100,50) | A | 2006/9/1 |
| 3001 | (110,50) | A | 2006/9/1 |
| 3002 | (120,50) | A | 2006/9/1 |
| 3003 | (130,50) | A | 2006/9/1 |
| ... | ... | ... | ... |

FIG. 6

OPERATOR TABLE

| OPERATOR ID | ATTRIBUTE INFORMATION | | | |
|---|---|---|---|---|
| | NAME | LEVEL | FACIAL PHOTOGRAPH | ... |
| a123 | Miyuki ABE | 4 | a123.jpg | ... |
| a125 | Atsuko KONDO | 4 | a125.jpg | ... |
| a215 | Kazumi HATANAKA | 5 | a215.jpg | ... |
| a148 | Shoko HASEGAWA | 3 | a148.jpg | ... |
| b042 | Hatsumi NARITA | 1 | b042.jpg | ... |
| ... | ... | ... | ... | ... |

FIG. 7

EVALUATION TABLE

| SEAT ID | CREATION DATE AND TIME | EVALUATOR CLASSIFICATION | EVALUATION CONTENTS |
|---|---|---|---|
| 3000 | 2006/12/1 10:24:20 | 1 | ... |
| 3000 | 2006/12/1 10:27:53 | 2 | ... |
| 3002 | 2007/1/12 10:35:09 | 2 | ... |
| 3001-1 | 2007/1/12 10:44:57 | 2 | ... |
| ... | ... | ... | ... |

FIG. 8

AUDIO RECORDING DATA TABLE

| SEAT ID | AUDIO RECORDING START DATE AND TIME | AUDIO RECORDING DATA |
|---|---|---|
| 3004 | 2006/12/1 12:04:20 | 1201120430.mp3 |
| 3003-1 | 2006/12/1 12:07:53 | 1201120733.mp3 |
| 3001-1 | 2006/12/1 12:15:09 | 1201121531.mp3 |
| 3004 | 2006/12/1 12:24:57 | 1201122430.mp3 |
| ... | ... | ... |

FIG. 9

READY-OPERATOR NUMBER TABLE

| TASK IDENTIFICATION CODE | NUMBER OF OPERATORS |
|---|---|
| A | 3 |
| B | 2 |
| C | 1 |
| D | 2 |

SKILL REGISTRATION

REGISTRATION TARGET DATE: 2007 ▼ YEAR | 1 ▼ MONTH | 12 ▼ DATE | BUSY SEASON ▼

COMMENT: [_____] 32

| SKILL ITEM | SKILL CHECK ITEM | CHECKPOINT | EVALUATION |
|---|---|---|---|
| BASICS | TELLING ONE'S NAME | CAPABLE OF TELLING ONE'S NAME AS INSTRUCTED | 2  1<br>○  ○ |
| | GREETINGS | CAPABLE OF MAKING APPROPRIATE GREETINGS AT FIRST | 4  3  2  1<br>○  ○  ◉  ○ |
| | | CAPABLE OF MAKING APPROPRIATE GREETINGS WHEN HOLDING A CALL | 2  1<br>○  ○ |
| | | CAPABLE OF MAKING SPECIFIC GREETINGS AT FIRST | 5  4  3  2  1<br>○  ○  ◉  ○  ○ |
| | VOICE | CAPABLE OF CLEARLY TALKING IN A CALM TONE OF VOICE THAT IS EASY TO UNDERSTAND | 5  4  3  2  1<br>○  ◉  ○  ○  ○ |
| | | VOLUME AND PITCH OF VOICE IS APPROPRIATE | 2  1<br>○  ○ |
| | | NOT SPEAKING FAST (SPEAKING SPEED IS ADAPTED TO THE CONVERSATION PARTNER) | 3  2  1<br>◉  ○  ○ |
| | | PITCH OF VOICE IN THE LAST WORD IS NOT RAISED/ LOWERED/STRETCHED/ EXTINGUISHED/STRENGTHENED | 4  3  2  1<br>◉  ○  ○  ○ |

33 ~ [REGISTER] [CLOSE] ~ 34

FIG. 14

7. SEAT ADJUSTMENT — 20

FLOOR SELECTION [FIRST FLOOR ▼]

| MON | TUE | WED | THU | FRI | SAT | SUN |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

DECEMBER, 2006 — 25, 26

| CAMPAIGN NAME | | RESPONSE RATE |
|---|---|---|
| SEMINAR | ▓ | ◯ 98% |
| NEW ENTRY | ▨ | ◯ 100% |
| MERCHANDISE INQUIRY | ≡ | ◯ 100% |
| MULTI-RESPONSE | ░ | ◯ 87% |

AS OF 2007/01/12 14:31

Seats (22):
- 3000 ABE | 3001 KONDO TAKITO | 3002 TOMINAKA | 3003 HASEGAWA NARITA | 3004 MUTOU (22b, 23)
- 3005 HOTTA | 3006 SUZUKI HIROSE | 3007 SHUMEI | 3008 FUJITA | 3009 HAGITA
- 3010 MAEDA | 3011 MACHIDA | 3012 | 3013 KUJOU | 3014
- 3015 MATUSHIMA | 3016 | 3017 | 3018 HIROTAKA | 3019

27, 28

| EXTENSION NUMBER | OPERATOR |
|---|---|
| 3000 | Miyuki ABE |
| 3001-1 | Atsuko KONDO |
| 3001-2 | Miho TAKITO |
| 3002 | Kazumi HATANAKA |
| 3003-1 | Shoko HASEGAWA |
| 3003-2 | Hatsumi NARITA |
| 3004 | Satsuki MUTO |

[PREVIOUS PAGE] [NEXT PAGE] [TOP] [EXTENSION NUMBER CHANGE] [CHANGE EXTENSION NUMBER] [PREVIOUS SHIFT] [NEXT SHIFT]

(CONVERSATION RECORDING PROCESSING)

SERVER DISPLAYING STATUS OF OPERATOR USING SEAT LAYOUT, TERMINAL FOR MANAGER, SYSTEM, AND METHOD

TECHNICAL FIELD

The present invention relates to a server, a manager terminal, a system and a method for displaying statuses of operators in a contact center by using a seat layout.

BACKGROUND ART

Conventionally, in a contact center, a manager, referred to as a supervisor, monitors the working statuses of a plurality of operators. A contact center has evolved from a call center that performs communications with customers mainly by telephones, and also includes communications with customers via channels such as FAX and E-mail. Utilization of a contact center is an important factor for an enterprise to perform efficient management. Therefore, it is necessary to pay utmost attention to the responses of the operators who directly communicate with the customers on behalf of the enterprise. Accordingly, the manager is required to monitor the working statuses of the operators, and to perform appropriate and prompt processing in response to the statuses. More specifically, when the manager finds an abnormality such as long duration of a call or a long processing time by way of a notice or the like from an operator, the manager provides the operator with support such as answering in place of the operator on the spot, or instructs the operator. Therefore, the role of the manager is important in maintaining and improving the service level of the calls and improving the business efficiency.

Moreover, the manager is responsible not only for responding on the spot, but also for directing and educating the operators. Therefore, it is also an important responsibility of the manager to evaluate the operators at any time while monitoring the daily work of the operators, and improve the skills of the operators by giving feed back of evaluations to the operators.

In such a situation, Patent Document 1, for example, has proposed an apparatus that displays a list of the operational statuses and the duration of calls of telephone terminal units so that a manager rapidly recognizes a shortage of operators.

[Patent Document 1] Japanese Unexamined Patent Application, First Publication No. 2003-309656

DISCLOSURE OF THE INVENTION

Problems to be Solved by the Invention

However, even with the apparatus of Patent Document 1, the manager only recognizes the shortage of the operators from the connection ratio and the duration of calls. Particularly, because of the characteristic of the operators who work in a situation in which their seats are not fixed, but change every time they come to work, the displaying of the list of the operational statuses as in the case of Patent Document 1 makes it difficult to know the statuses of the respective operators on a timely basis, particularly including the statuses of times other than the duration of calls. Therefore, it is still difficult for the manager to quickly realize the working abnormalities of the respective operators.

Moreover, the apparatus according to Patent Document 1 is not provided with a means for a manager to perform timely evaluation of an operator's work. Although it is conceivable to make evaluations and the like by a separate operation, it is complicated to evaluate by a separate operation while monitoring.

Accordingly, it is an object of the present invention to provide a server and the like, which can display statuses of operators by using a seat layout, and which can facilitate evaluations of the operators.

Means for Solving the Problems

More specifically, the following are provided for the aforementioned object.

According to a first aspect of the present invention, a server, which is connected via a communication line to operator terminals including a telephone function and a manager terminal including a display unit in a contact center, includes in a memory unit:

an operator identification table for storing data that enables identification of operators operating the operator terminals on an hourly basis by associating seat IDs uniquely indicating the operator terminals and operator IDs identifying the operators operating the operator terminals; and a layout table for storing layout data that indicates layout locations of the operator terminals based on the seat IDs, in which the server includes:

a unit configured to receive operational status data, which is transmitted from the operator terminals, and which indicates operational statuses of the operator terminals, together with the seat IDs;

a unit configured to read the layout data from the layout table; and a unit configured to generate display data based on the seat IDs from the read layout data to display a seat layout image indicating operational statuses that are different depending on types of the received operational status data, and to transmit the display data to the manager terminal.

According to the configuration of the first aspect, the server is connected via a communication line to operator terminals including a telephone function and a manager terminal including a display unit in a contact center; the server includes in a memory unit: an operator identification table for storing data that enables identification of operators operating the operator terminals on an hourly basis by associating seat IDs uniquely indicating the operator terminals and operator IDs identifying the operators operating the operator terminals; and a layout table for storing layout data that indicates layout locations of the operator terminals based on the seat IDs; the server receives, together with the seat IDs, operational status data, which is transmitted from the operator terminals, and which indicates operational statuses of the operator terminals; the server reads the layout data from the layout table; and the server generates display data based on the seat IDs from the read layout data to display a seat layout image indicating operational statuses that are different depending on types of the received operational status data, and transmits the display data to the manager terminal.

This enables the manager to monitor the operational statuses of the operator terminals from the seat layout image displayed on the display unit. In this way, by appealing to the manager's vision in a similar manner to the actual seat layout, the manager can watch the operational statuses in the format of the seat layout which is intuitively easy to comprehend, thereby leading to a possibility that an operator having a problem can be quickly found. As a result, the speed at which the manager copes with problems caused by the operators is increased, thereby leading to a possibility to improve the processing efficiency and the reliability in the contact center. Particularly in a situation in which operators are assigned differently everyday, the present invention is preferable since it enables the manager to identify the operators by way of the seats.

According to a second aspect of the present invention, the server as described in the first aspect further includes:
- a unit configured to receive, from the manager terminal, evaluation data of an operator operating one operator terminal, which has been input by a manager into an evaluation input form displayed on the display unit of the manager terminal, together with the seat ID indicating the one operator terminal, in response to the manager terminal having accepted a selection of the one operator terminal among the operator terminals displayed as the seat layout image on the display unit of the manager terminal, together with designation of time; and
- a unit configured to store the received evaluation data into the memory unit by associating with the received seat IDs.

According to the configuration of the second aspect, the server receives, from the manager terminal, evaluation data of an operator operating one operator terminal, which has been input by a manager into an evaluation input form displayed on the display unit of the manager terminal, together with the seat ID indicating the one operator terminal, in response to the manager terminal having accepted a selection of the one operator terminal among the operator terminals displayed as the seat layout image on the display unit of the manager terminal, together with designation of time; and the server stores the received evaluation data into the memory unit by associating with the received seat IDs.

As thus described, when the manager selects an operator terminal indicated by one seat from the seat layout image displayed on the display unit, an evaluation input form is displayed on the screen. The manager can perform an input on the displayed evaluation input screen, and can register the input evaluation data with the server. Accordingly, when it is desired to input evaluation data, an operator is designated not by a name list, but by directly selecting one seat in the layout image which is intuitively easy to grasp, and an input form for the corresponding operator is displayed, thereby making it possible to immediately perform an input of evaluations. Therefore, an input is possible by a simple operation without complicated operations. Moreover, the registered evaluation data can be utilized when feeding back the evaluations.

According to a third aspect of the present invention, the server as described in the first aspect further includes:
- a unit configured to transmit, to the manager terminal, data of an evaluation input form for inputting evaluation data of an operator operating one operator terminal based on the seat ID indicating the one operator terminal, which has been transmitted in response to the manager terminal having accepted a selection of the one operator terminal among the operator terminals displayed as the seat layout image on the display unit of the manager terminal, together with designation of time;
- a unit configured to receive, from the manager terminal, the evaluation data of the operator operating the one operator terminal, which has been input by a manager into the evaluation input form displayed on the display unit of the manager terminal, together with the seat ID indicating the one operator terminal, in response to the manager terminal having received the data of the evaluation input form; and
- a unit configured to store the received evaluation data into the memory unit by associating with the received seat IDs.

According to the configuration of the third aspect, the server transmits, to the manager terminal, data of an evaluation input form for inputting evaluation data of an operator operating one operator terminal based on the seat ID indicating the one operator terminal, which has been transmitted in response to the manager terminal having accepted a selection of the one operator terminal among the operator terminals displayed as the seat layout image on the display unit of the manager terminal, together with designation of time; the server receives, from the manager terminal, the evaluation data of the operator operating the one operator terminal, which has been input by a manager into the evaluation input form displayed on the display unit of the manager terminal, together with the seat ID indicating the one operator terminal, in response to the manager terminal having received the data of the evaluation input form; and the server stores the received evaluation data into the memory unit by associating with the received seat IDs.

This makes it possible to add, to the evaluation input form to be transmitted to the manager terminal in response to the request by the manager terminal, information included in the server such as information relating to an operator to be evaluated, for example, as information stored in the memory unit provided to the server. As a result, the number of input items can be reduced when the manager inputs the evaluations, and only the necessary items can be appropriately displayed, thereby leading to a possibility that the management task efficiency can be increased.

According to a fourth aspect of the present invention, in the server as described in the third aspect, the unit configured to transmit the data of the evaluation input form transmits the data of the evaluation input form, together with other evaluation data, which is stored in advance in the memory unit in association with the seat ID, of the operator operating the one operator terminal, to the manager terminal.

According to the configuration of the fourth aspect, the server transmits the data of the evaluation input form, together with other evaluation data, which is stored in advance in the memory unit in association with the seat ID, of the operator operating the one operator terminal, to the manager terminal. Here, the other evaluations of the operator refer to the evaluations that have been input by the operator himself/herself, or the evaluations made by the manager for the operator in the past. This makes it possible to display the evaluation input form, into which an input can be performed by comparing with the other evaluations, on the manager terminal, and thus it can be used as auxiliary information for performing useful evaluations.

According to a fifth aspect of the present invention, in the server as described in the third or fourth aspect, the unit configured to transmit the data of the evaluation input form transmits the data of the evaluation input form, together with image data of the operator operating the one operator terminal, based on the seat ID, to the manager terminal.

According to the configuration of the fifth aspect, the server transmits the data of the evaluation input form, together with image data of the operator operating the one operator terminal, based on the seat ID, to the manager terminal. Here, the image data of the operator refers to image data which makes it possible to identify the operator, for example, such as a facial photograph or a portrait of the operator. This makes it possible to display the image data of the operator in the evaluation input form to be displayed on the manager terminal. Accordingly, the manager can easily recognize an operator to be evaluated.

According to a sixth aspect of the present invention, in the server as described in any one of the third to fifth aspects, the data of the evaluation input form is data configured so as to enable inputting thereof by accepting a selection of predetermined input items.

According to the configuration of the sixth aspect, the data of the evaluation input form transmitted from the server is data configured so as to enable inputting thereof by accepting a selection of predetermined input items. This enables the manager to make evaluations of operators by inputting from the manager terminal with an easy operation, leading to a possibility that the management task efficiency may be increased.

According to a seventh aspect of the present invention, in the server as described in any one of the first to sixth aspects, the types of the operational status data include a type for determining whether the operator terminals are at least operating.

According to the configuration of the seventh aspect, the types of the operational status data include a type for determining whether the operator terminals are at least operating. This enables the server to display, on the manager terminal, information indicating the operational statuses regarding whether the operator terminals are operating, based on the operational status data.

According to an eighth aspect of the present invention, in the server as described in any one of the first to seventh aspects, the operational status data transmitted from the operator terminal is received in response to the operator terminal having accepted an operation from the operator.

According to the configuration of the eighth aspect, the operator terminal transmits the operational status data to the server in response to accepting the operation from the operator, and the server receives the operational status data. This makes it possible to know the operational statuses of the operator terminals by receiving the operational status data transmitted from the operator terminals, without inquiring with the operator terminals about the operational statuses from the server.

According to a ninth aspect of the present invention, in the server as described in any one of the first to seventh aspects, the operational status data transmitted from the operator terminal is received, provided that the operator terminal does not accept an operation from the operator within a predetermined time.

According to the configuration of the ninth aspect, in a case in which the operator terminal does not accept an operation from the operator for five seconds, for example, as a predetermined time, the operational status data is transmitted to the server, and the server receives the operational status data. This makes it possible to know the operational statuses of the operator terminals by receiving the operational status data transmitted from the operator terminals, without inquiring with the operator terminals about the operational statuses from the server.

According to a tenth aspect of the present invention, the server as described in any one of the first to ninth aspects further includes:
  a unit configured to store, in the memory unit, conversation data including telephone call contents of the operator operating the operator terminal indicated by the seat ID received from the operator terminal, in association with the received seat ID; and
  a unit configured to extract the conversation data of the operator operating one operator terminal from the memory unit and to transmit the conversation data to the manager terminal, based on a seat ID indicating the one operator terminal, which has been transmitted in response to the manager terminal having accepted a selection of the one operator terminal among the operator terminals displayed as the seat layout image on the display unit of the manager terminal, together with designation of time.

According to the configuration of the tenth aspect, the server stores, in the memory unit, conversation data including telephone call contents of the operator operating the operator terminal indicated by the seat ID received from the operator terminal, in association with the received seat ID; and the server extracts the conversation data of the operator operating one operator terminal from the memory unit and transmits the conversation data to the manager terminal, based on a seat ID indicating the one operator terminal, which has been transmitted in response to the manager terminal having accepted a selection of the one operator terminal among the operator terminals displayed as the seat layout image on the display unit of the manager terminal, together with designation of time.

This enables the manager to obtain the conversation data including the telephone call contents of the operator stored in the memory unit of the server, by selecting the operator terminal indicated by one seat from the seat layout image displayed on the display unit of the manager terminal. Therefore, it is possible to obtain the conversation data easily and adequately, by simply selecting the layout that is intuitively easy to comprehend. Accordingly, there is a possibility that the conversation data may be useful in coaching the operators.

According to an eleventh aspect of the present invention, in the server as described in any one of the first to tenth aspects,
  the layout table further includes task identification data indicating a task of responding based on the seat ID on an hourly basis, the server further includes:
  a unit configured to transmit notice data to the operator terminal in response to, and notifying, a fact that the number for the operational status data of a type, which indicates that a call is receivable, falls below a predetermined numeric value, for each type of the task identification data, by using the layout table stored in the memory unit.

According to the configuration of the eleventh aspect, the layout table in the memory unit of the server further includes task identification data indicating a task of responding based on the seat ID on an hourly basis, the server transmits notice data to the operator terminal in response to, and notifying, a fact that the number for the operational status data of a type, which indicates that a call is receivable, falls below a predetermined numeric value, for each type of the task identification data, by using the layout table stored in the memory unit.

This enables the operators to watch the notice display at the right timing, which may provide an opportunity to perform a rapid response such as finishing the current telephone call early.

According to a twelfth aspect of the present invention, in the server as described in the eleventh aspect, the unit configured to transmit the notice data transmits data of the number of ready operators indicating the number of operators who can accept the call, together with the notice data, to the operator terminals.

According to the configuration of the twelfth aspect, the server transmits data of the number of ready operators indicating the number of operators who can accept the call, together with the notice data, to the operator terminals. This enables the operators to watch the display of the number of the ready operators together with the notice display, which may provide an opportunity to perform a rapid response such as finishing the current telephone call early, depending on the displayed number of the operators.

According to a thirteenth aspect of the present invention, a manager terminal, which is connected via a communication line to a server communicably connected to operator terminals having a telephone function in a contact center, and which includes a display unit, includes:

- a unit configured to receive display data, which is transmitted from the server, to display a seat layout image showing operational statuses that are different depending on types of operational status data indicating operational statuses of the operator terminals; and
- a unit configured to display the seat layout image on the display unit based on the received display data.

Therefore, it is possible to provide the manager terminal having the operations and effects similar to those of the first aspect.

According to a fourteenth aspect of the present invention, the manager terminal as described in the thirteenth aspect further includes:

- a unit configured to display, on the display unit, an evaluation input form for inputting evaluation data of an operator operating one operator terminal in response to having accepted a selection of the one operator terminal among the operator terminals displayed as the seat layout image on the display unit, together with designation of time;
- a unit configured to accept an input of the evaluation of the operator by a manager operating the manager terminal; and
- a unit configured to transmit evaluation data showing the accepted evaluation of the operator, together with a seat ID indicating the one operator terminal, to the server.

Therefore, it is possible to provide the manager terminal having the operations and effects similar to those of the second aspect.

According to a fifteenth aspect of the present invention, the manager terminal as described in the thirteenth aspect further includes:

- a unit configured to transmit, together with a seat ID indicating one operator terminal, data for requesting an evaluation input form for inputting evaluation data of an operator operating the one operator terminal in response to having accepted a selection of the one operator terminal among the operator terminals displayed as the seat layout image on the display unit, together with designation of time;
- a unit configured to receive data of the evaluation input form transmitted from the server;
- a unit configured to display the evaluation input form on a display unit, based on the data of the received evaluation input form;
- a unit configured to accept an input of the evaluation of the operator by a manager operating the manager terminal; and
- a unit configured to transmit evaluation data showing the accepted evaluation of the operator, together with a seat ID indicating the one operator terminal, to the server.

Therefore, it is possible to provide the manager terminal having the operations and effects similar to those of the third aspect.

According to a sixteenth aspect of the present invention, in the manager terminal as described in the fifteenth aspect, the unit configured to receive the data of the evaluation input form receives the data of the evaluation input form, together with other evaluation data, which is stored in advance in the memory unit in association with the seat ID, of the operator operating the one operator terminal, from the server.

Therefore, it is possible to provide the manager terminal having operations and effects similar to those of the fourth aspect.

According to a seventeenth aspect of the present invention, in the manager terminal as described in the fifteenth aspect, the unit configured to receive the data of the evaluation input form receives the data of the evaluation input form, together with image data of the operator operating the one operator terminal based on the seat ID, from the server.

Therefore, it is possible to provide the manager terminal having the operations and effects similar to those of the fifth aspect.

According to an eighteenth aspect of the present invention, in the manager terminal as described in any one of the fourteenth to seventeenth aspects, the evaluation input form is configured so as to enable inputting by accepting a selection of predetermined input items.

Therefore, it is possible to provide the manager terminal having operations and effects similar to those of the sixth aspect.

According to a nineteenth aspect of the present invention, in the manager terminal as described in any one of the fourteenth to eighteenth aspects, the evaluation input form is displayed on the display unit as a screen that is different from a screen displaying statuses of operators operating the operator terminals displayed on the display unit as a seat layout image.

According to the configuration of the nineteenth aspect, the evaluation input form displayed on the manager terminal is displayed on the display unit as a screen that is different from a screen displaying statuses of operators operating the operator terminals displayed on the display unit as a seat layout image. As a result, the evaluation input form displayed on the display unit of the manager terminal is displayed as a new screen that is different from the screen displaying the seat layout image, thereby making it possible to return to the screen displaying the original seat layout image immediately after inputting the evaluations.

According to a twentieth aspect of the present invention, the manager terminal as described in any one of the thirteenth to nineteenth aspects further includes:

- a unit configured to transmit, together with a seat ID indicating one operator terminal, data for requesting conversation data including telephone call contents of an operator operating the one operator terminal in response to having accepted a selection of the one operator terminal among the operator terminals displayed as the seat layout image on the display unit, together with designation of time; and
- a unit configured to receive, from the server, the conversation data extracted at the server based on the transmitted request data.

According to the configuration of the twentieth aspect, the manager terminal transmits, together with a seat ID indicating one operator terminal, data for requesting conversation data including telephone call contents of an operator operating the one operator terminal in response to having accepted a selection of the one operator terminal among the operator terminals displayed as the seat layout image on the display unit, together with designation of time; and the manager terminal receives, from the server, the conversation data extracted at the server based on the transmitted request data.

Therefore, it is possible to provide the manager terminal having operations and effects similar to those of the tenth aspect.

According to a twenty-first aspect of the present invention, in a system, for a contact center, including operator terminals including a telephone function, a manager terminal including a display unit, and a server connected via a communication line to the operator terminals and the manager terminal, the server includes: a memory unit having an operator identification table for storing data that enables identification of operators operating the operator terminals on an hourly basis by associating seat IDs uniquely indicating the operator terminals and operator IDs identifying the operators operating the operator terminals; and a layout table for storing layout data that indicates layout locations of the operator terminals based on the seat IDs;

a unit configured to transmit, by the operator terminals, operational status data indicating operational statuses of the operator terminals, together with the seat IDs;

a unit configured to receive the operational status data, by the server;

a unit configured to read the layout data from the layout table, by the server;

a unit configured to generate, by the server, display data based on the seat IDs from the read layout data to display a seat layout image indicating operational statuses that are different depending on types of the received operational status data, and transmitting the display data to the manager terminal;

a unit configured to receive the display data, by the manager terminal; and a unit configured to display, by the manager terminal, the seat layout image on the display unit based on the display data.

Therefore, it is possible to provide a system having operations and effects similar to those of the first aspect.

According to a twenty-second aspect of the present invention, in a method for a contact center employing a computer connected via a communication line to operator terminals including a telephone function and a manager terminal including a display unit, in which the computer includes in a memory unit: an operator identification table for storing data that enables identification of operators operating the operator terminals on an hourly basis by associating seat IDs uniquely indicating the operator terminals and operator IDs identifying the operators operating the operator terminals; and a layout table for storing layout data that indicates layout locations of the operator terminals based on the seat IDs, the method includes steps of the computer:

receiving, together with the seat IDs, operational status data, which is transmitted from the operator terminals, and which indicates operational statuses of the operator terminals;

reading the layout data from the layout table; and generating display data based on the seat IDs from the read layout data to display a seat layout image indicating operational statuses that are different depending on types of the received operational status data, and transmitting the display data to the manager terminal.

Therefore, it is possible to provide the method having operations and effects similar to those of the first aspect.

Effects of the Invention

According to the present invention, it is possible to provide a server and the like which would facilitate evaluations of operators by displaying statuses of the operators by use of a seat layout.

BRIEF DESCRIPTION OF THE DRAWINGS

FIG. 3 shows an operator identification table stored in the memory unit of the server according to an example of the preferred embodiment of the present invention;

FIG. 4 shows an operational status table stored in the memory unit of the server according to an example of the preferred embodiment of the present invention;

FIG. 5 shows a layout table stored in the memory unit of the server according to an example of the preferred embodiment of the present invention;

FIG. 6 shows an operator table stored in the memory unit of the server according to an example of the preferred embodiment of the present invention;

FIG. 7 shows an evaluation table stored in the memory unit of the server according to an example of the preferred embodiment of the present invention;

FIG. 8 shows an audio recording data table stored in the memory unit of the server according to an example of the preferred embodiment of the present invention;

FIG. 9 shows a table of the number of ready operators, which is stored in the memory unit of the server according to an example of the preferred embodiment of the present invention;

FIG. 10 shows a screen display example of monitoring statuses in the manager terminal according to an example of the preferred embodiment of the present invention;

FIG. 13 shows a screen display example of an evaluation input form in the manager terminal according to an example of the preferred embodiment of the present invention;

FIG. 14 shows a screen display example for displaying a past seat layout in the manager terminal according to an example of the preferred embodiment of the present invention;

PREFERRED MODE FOR CARRYING OUT THE INVENTION

An embodiment of the present invention is described hereinafter with reference to the drawings. It should be noted that this is merely an example, and the technical scope of the present invention is not limited thereto.

System Overview

Figure 1:
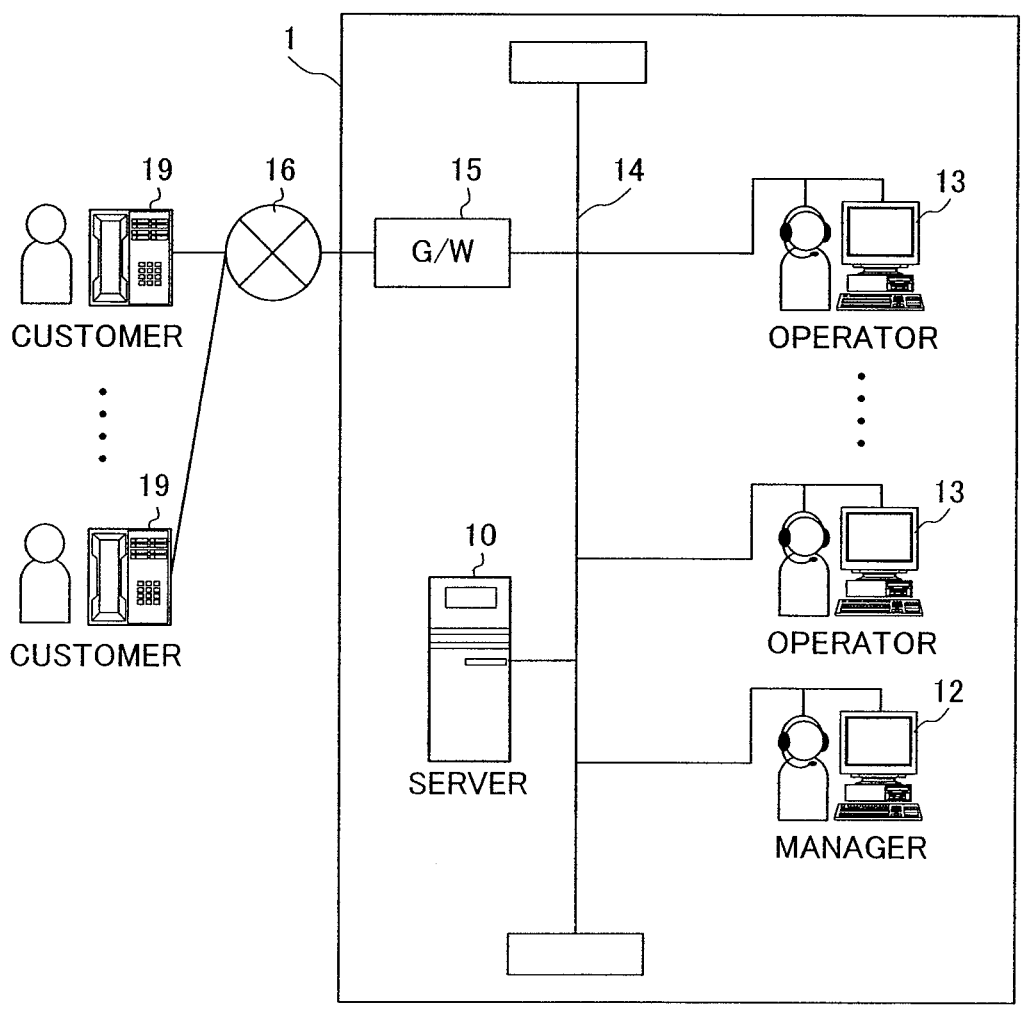
FIG. 1 is a diagram showing an overall configuration including a system according to an example of a preferred embodiment of the present invention.

FIG. 1 is a diagram showing an entire configuration including a system 1 of a contact center according to an example of a preferred embodiment of the present invention.

The system 1, which constitutes the present invention, is connected to customers' telephones 19 via a network 16. Here, types of the telephones 19 do not make any difference. For example, the telephone 19 may be a general telephone for audio communications using a telephone exchange, or may be an IP telephone that is provided by a technique as referred to as VoIP (Voiceover Internet Protocol). In a case in which the telephones 19 are general telephones, the network 16 is a telephone network, and in a case in which the telephones 19 are IP telephones, the network 16 is an IP network.

The telephone data from the customers' telephones 19 is transmitted to a server 10 via a G/W (Gateway) 15. The G/W 15 is an intermediary device that is necessary to perform communications between the telephones 19 and the server 10. The G/W 15 enables mutual conversions of data even in a case in which the data protocols are different from one another, thereby enabling communications. The telephone data, which has been transmitted from the telephones 19, and which has been enabled to be communicated to the server 10 by the G/W 15, is transmitted to the server 10 via a network 14. The network 14 represents a LAN (Local Area Network), a dedicated line or the like. The network 14 may be any network as long as communication is possible.

The server 10 monitors statuses of respective operator terminals 13 used by a plurality of operators in the contact center, and determines statuses of the respective operators, such as currently in a call with a customer, currently on holding for a call, or currently waiting for a call. Moreover, display data for displaying the statuses of the operators as a seat layout image on a manager terminal 12 is generated and transmitted. Furthermore, evaluation input form data for inputting evaluation of the operators is transmitted, and the server 10 stores the received evaluation data.

In addition, the server 10 stores the contents of the telephone calls, which have been received at the operator terminals 13, as audio recording data to be described later. Moreover, the server 10 transmits the audio recording data in response to a request from the manager terminal 12.

The manager terminal 12 is a terminal that is provided with a telephone function and a display function. The display data indicating the operational statuses transmitted from the server 10 is received, and the operational statuses are displayed as an image of a seat layout. Moreover, an input operation for the evaluation of the operators is accepted, and the input evaluation data is transmitted to the server 10. Furthermore, a selection for requesting the audio recording data is accepted for listening to the audio recording data, in which the conversation contents of the operators are recorded, and the request data is transmitted to the server 10. The manager terminal 12 then performs control for listening to the received audio recording data in accordance with the input operation.

The operator terminal 13 is also a terminal that is provided with the telephone function and the display function as in the case of the manager terminal 12. When an operator operates the operator terminal 13, the operator terminal 13 transmits operational status data to the server 10. Moreover, even in a case in which no operation is accepted for a predetermined time, the operator terminal 13 transmits the operational status data to the server 10. Moreover, in a case in which the number of ready operators is small, a notice screen transmitted from the server 10 is displayed.

It should be noted that, although the server 10 and the manager terminal 12 are separate devices in the present embodiment, the configuration is not limited thereto, and a single device may be configured to include both of the functions.

Although the server 10 is configured to have a telephone exchange function as well in the present embodiment, it is not limited thereto, and a telephone exchange may be separately provided so that the server 10 receives telephone call information at any time from the telephone exchange.

Furthermore, although the manager terminal 12 and the operator terminal 13 are the devices that are provided with the telephone function and the display function in the present embodiment, the configuration is not limited thereto, and the telephone function and the display function may be provided by separate devices.

Computer Configuration

Figure 2:
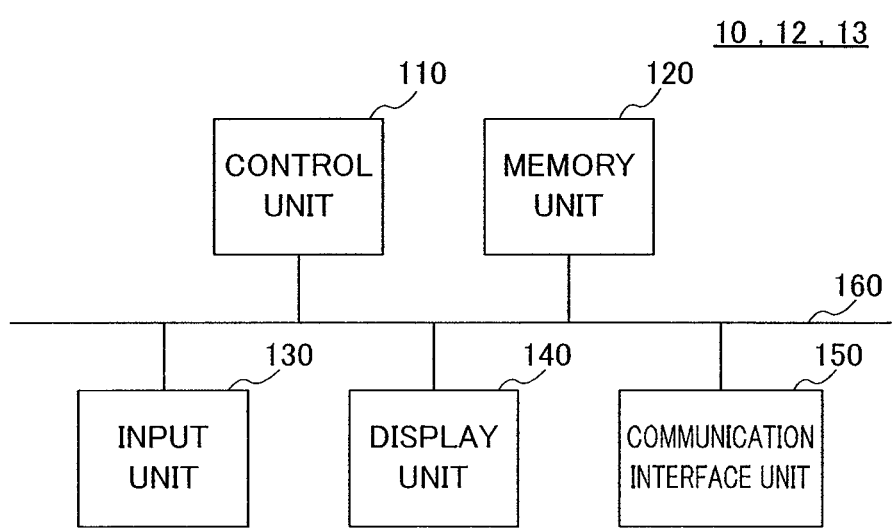
FIG. 2 is a block diagram showing the configuration of the computers which constitute the system according to an example of the preferred embodiment of the present invention.

FIG. 2 is a block diagram showing the configuration of the computers (the server 10, the manager terminal 12 and the operator terminals 13) which constitute the system 1 according to an example of the preferred embodiment of the present invention.

A control unit 110, a memory unit 120, an input unit 130, a display unit 140 and a communication interface unit 150 are connected to one another via a bus 160.

The control unit 110 is an information processing unit (CPU) that performs computing and processing of information, and controls the entire computer. The control unit 110 appropriately reads and executes various programs stored in the memory unit 120, thereby collaborating with the aforementioned hardware, and implementing various functions according to the present invention.

The memory unit 120 may include local memory used for program execution in combination with the control unit 110, large-capacity bulk memory, and cache memory used for efficiently performing a search in the bulk memory. A computer-readable medium, which realizes the memory unit 120, may include a medium for electrical, magnetic, optical or electromagnetic implementation. More specifically, included are a semiconductor memory, a magnetic tape, a magnetic disc, a random access memory (RAM), a read-only memory (ROM), and an optical disc including CD-ROM, CD-R/W and DVD.

The input unit 130 accepts an input by the user, and may include a keyboard, a pointing device and the like. The input unit 130 can be connected to the computer directly or via an intermediate I/O controller.

The display unit 140 displays a screen for accepting a data input for the user, displays a screen of processing results by the computer, and includes display units such as a cathode ray tube display unit (CRT) and a liquid crystal display unit (LCD). The display unit 140 can be connected to the computer directly or via the intermediate I/O controller.

Moreover, a configuration may be employed in which a touch panel is arranged on the display unit 140 such that the display unit 140 includes the input unit 130 as well.

The communication interface unit 150 is a network adapter for enabling the computer to be connected to another processing system or a storage device via a dedicated network or a public network. The communication interface unit 150 may include a modem, a cable modem and an Ethernet (registered trademark) adapter.

Table Configuration

FIGS. 3 to 9 show various tables stored in the memory unit 120 of the server 10 according to an example of the preferred embodiment of the present invention. FIG. 3 shows an operator identification table.

The memory unit 120 stores, for example, as the operator identification table shown in FIG. 3, a "seat ID" which is a code for uniquely defining a seat for an operator terminal 13, an "operator ID" which is uniquely defined for each operator, and which indicates an operator belonging to a seat, a "sign-on time" when the operator begins occupancy of the seat, and a "sign-off time" when the operator ends occupancy of the seat.

For example, the top-end record shown in FIG. 3 indicates that, regarding a seat with a seat ID "3000", an operator with an operator ID "a123" started using the seat with the seat ID "3000" at "2006/12/1, 9:00:00" and finished using the seat at "2006/12/1, 18:00:00". Here, the sign-on date and time and the sign-off date and time do not include a time for leaving a seat for a short time such as a lunch break or other break, but indicates times such as a time of arriving at the office and a time of leaving the office, which are defined as the shift time of the operator.

Regarding a record that is the second from the top shown in FIG. 3, a seat ID thereof is "3001-1" to which a branch number is assigned, and this shows that two operators can work at the operator terminal 13 of which the seat ID is "3001" as shown in FIG. 14 to be described later.

The control unit 110 of the server 10 refers to the operator identification table in processing to be described later (Step S103 of FIG. 18 and the like), and identifies an operator who meets a condition based on a seat ID and time data transmitted from the manager terminal 12.

FIG. 4 shows an operational status table. The memory unit 120 of the server 10 stores, for example, as shown in FIG. 4, a "status" that indicates a type of a current operational status with a "seat ID" as a key.

Here, the "status" indicates five types of operational statuses in the present embodiment. For example, "0" indicates an unused status, "1" indicates an in-preparation status, "2" indicates a ready status, "3" indicates a currently-talking status, and "4" indicates a reserved status, respectively. The "unused" status refers to a status in which no operator is assigned to the seat. Moreover, the "in-preparation" status refers to a status in which another response can not be made due to a task for following up the response made just before that and the like. The "ready" status refers to a status in which a response can be made anytime. The "currently-talking" status refers to a status in which a response is currently being made. The "reserved" status refers to a status in which a reservation has been made for a particular customer, and thus any phone call except a phone call from the reserved party can not be answered.

For example, in FIG. 4, the status of the seat with the seat ID "3001" is "2", and this shows the ready status in which a response can be made anytime. It should be noted that, here, the "seat IDs" of the operational status table do not have branch numbers for the seat IDs as shown in FIG. 3. This is because a branch number is not required since there is one piece of telephone data for a customer to respond to, even in a case in which the seat ID has a branch number.

When the control unit 110 of the server 10 receives operational status data from the operator terminal 13 in processing to be described later (Step S11 of FIG. 17), the control unit 110 updates the operational status table based on the received seat ID.

FIG. 5 shows a layout table. For example, the memory unit 120 of the server 10 stores, for example, as shown in FIG. 5, a layout position "(X, Y)" of a seat indicated by a seat ID, from the "start date" to the date before the next "start date", and a task identification code indicating a campaign to be responded at the seat, with the "seat ID" and the "start date" as keys.

For example, the top record shown in FIG. 5 indicates that the layout location (coordinates) of the seat with the seat ID "3000" is "(100, 50)", the task identification code is "A", and this layout started to be used from "2006/9/1".

Here, the "task identification code" in the present embodiment indicate four types shown as campaign names around the left center of FIG. 10 to be described later. For example, according to FIG. 10, "A" is a task for seminars, "B" is a task for new entries, "C" is a task for merchandise inquiries, and "D" is a multi-response that can cope with any task of the above.

Figure 10:
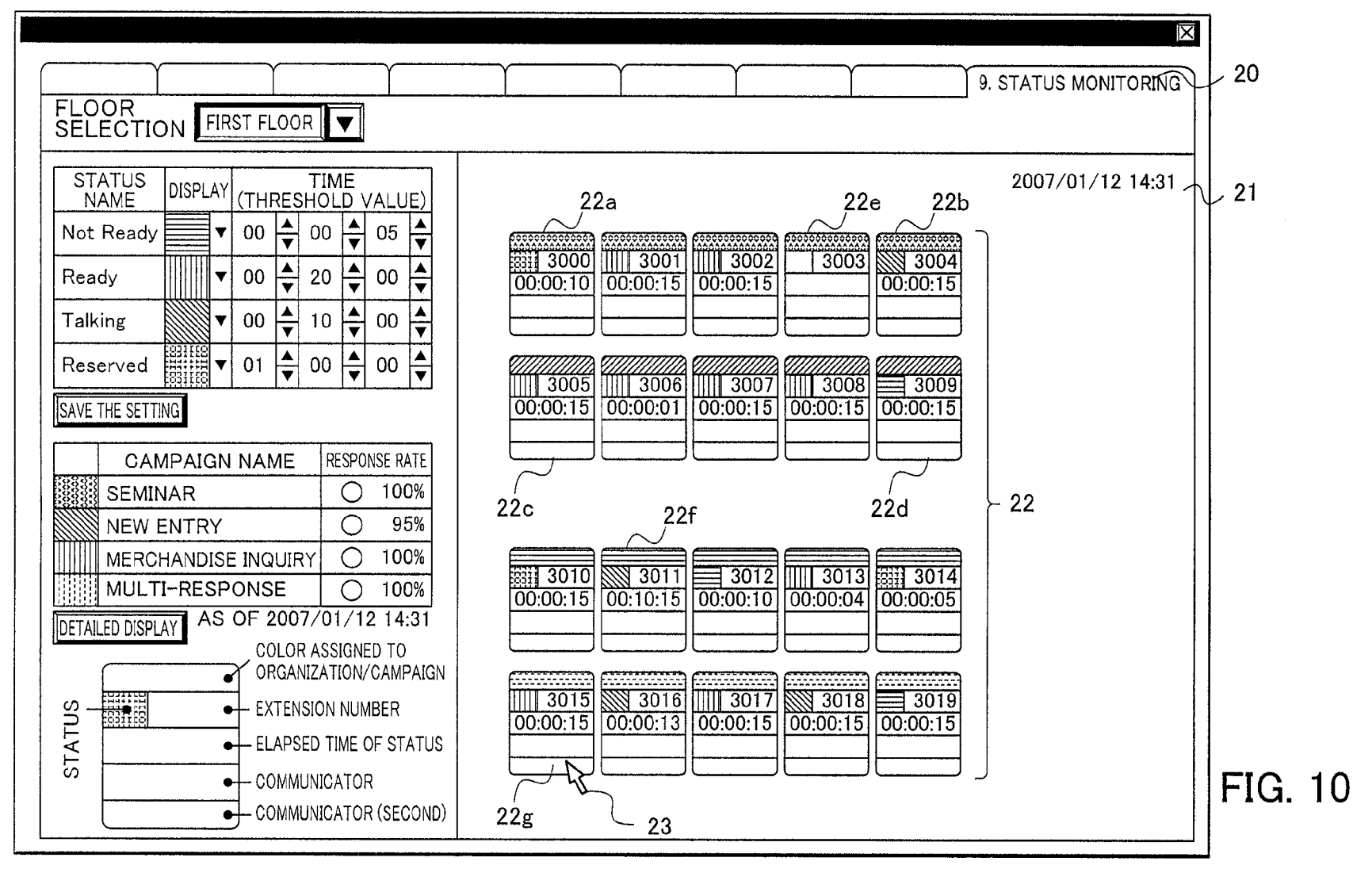

The control unit 110 of the server 10 refers to the layout table in processing to be described later (Step S12 of FIG. 17), generates seat layout image data as shown in FIG. 10, and transmits it to the manager terminal 12.

FIG. 6 shows an operator table. The memory unit 120 of the server 10 stores information, for example, as shown in FIG. 6, such as a "name" as attribute information of an operator, a "level" that shows the level of task proficiency, a "facial photograph" that is an image of the operator, with the "operator ID" as a key. It should be noted that the attribute information may include information on other various attributes of the operator. Moreover, although the "facial photograph" in the present embodiment is directly stored as a JPEG (Joint Photographic Experts Group) file that is a photographic file, the link information of the memory location of the photographic file may be stored, and the link may be referred to as necessary.

For example, the top record shown in FIG. 6 indicates that an operator with an operator ID "a123" has a name "Miyuki ABE", the level thereof is "4", and the facial photograph thereof is shown as image data "123.jpg".

Here, the "level" indicates a level of task proficiency as a numeric value in the present embodiment, and the greater the numeric value is, the more experienced the operator is.

The control unit 110 of the server 10 refers to the operator table in processing to be described later (Step S104 of FIG. 18), extracts a facial photograph of the corresponding operator, and transmits it to the manager terminal 12.

Figure 11:
FIG. 11 shows a screen display example of an evaluation input form in the manager terminal according to an example of the preferred embodiment of the present invention.
Figure 12:
FIG. 12 shows a screen display example of an evaluation input form in the manager terminal according to an example of the preferred embodiment of the present invention.

FIG. 7 shows an evaluation table. The memory unit 120 stores, for example, as shown in FIG. 7, an operator's "evaluation contents" that are uniquely defined by the operator ID that can be identified by the operator identification table by the seat ID and the creation date, with the "seat ID", the "creation date and time" and the "evaluator classification" as keys. It should be noted that the "evaluation contents" show questionnaire entries about the response of the operator as shown in FIGS. 11 to 13 to be described later, and an evaluation is stored for each questionnaire entry.

For example, the top record shown in FIG. 7 is an evaluation for the operator who has operated at a seat with a seat ID "3000", and the evaluator identification is "1", which shows that the evaluation data has been input by the operator with the seat ID "3000" by himself/herself. Moreover, it is shown that the present evaluation was registered with the memory unit 120 on "2006/12/1, 10:24:20".

Here, the "evaluator classification" in the present embodiment identifies a person who has input the evaluation, in which "1" indicates the first-person, and "2" indicates another person except the first-person, e.g., the boss.

The control unit 110 of the server 10 refers to the evaluation table and the operator table in processing to be described later (Step S105 of FIG. 18), extracts the latest evaluation data of which evaluator identification is "2" among the past evaluations of the corresponding operator, and transmits it to the manager terminal 12. Moreover, the control unit 110 of the server 10 stores the evaluation data, which has been transmitted from the manager terminal 12, to the evaluation table in processing to be described later (Step S109 of FIG. 18).

FIG. 8 shows an audio recording data table. The memory unit 120 stores, for example, as shown in FIG. 8, "audio recording data" in which conversation contents have been recorded, with the "seat ID" and the "audio recording start date and time" as keys.

For example, the top record shown in FIG. 8 indicates that the audio recording data of the conversation contents, which was recorded by an operator responding at a seat with a seat ID "3004" from the audio recording start date and time "2006/12/1, 12:04:20" until the end of the response, is stored as audio file "1201120430.mp3". It should be noted that, although the present embodiment is configured to directly store the "audio recording data" as an MP3 (MPEG Audio Layer-3) file that is an audio file, only the link information of the memory location of the audio file may be stored, and the link may be referred to as necessary.

The control unit 110 of the server 10 stores the audio recording data, in which the conversation has been recorded by the server, to the audio recording data table in processing to be described later (Step S23 of FIG. 19). Furthermore, the control unit 110 of the server 10 transmits the search result data of the target audio recording data in response to a request from the manager terminal 12 in processing to be described later (Step S114 of FIG. 20), and transmits the target audio recording data in response to an audio recording data playback request from the manager terminal 12 in processing to be described later (Step S116 of FIG. 20).

Lastly, FIG. 9 shows a ready-operator number table. The memory unit 120 of the server 10 stores, for example, as shown in FIG. 9, the "ready operator number" that is the number of operators who can respond to an inquiry from the customer's telephone 19, for each "task identification code".

For example, the top record shown in FIG. 9 indicates that, since the number of operators is "3" for the task of which task identification code is "A", three operators are currently in a status in which they can respond to phone calls from customers.

The control unit 110 of the server 10 determines whether a predetermined number has been reached for each task identification code based on the number of operators in the ready operator number table of FIG. 9 that is consolidated information, in processing to be described later (Step S33 of FIG. 21).

In a case in which the predetermined number has not been reached, notice data is created, and the notice data is transmitted to the operator terminal 13.

It should be noted that the table configuration described as the present embodiment is merely an example. Information necessary for performing various processing to be described later may be stored in the memory unit 120 of the server 10 with the seat ID as a key. Therefore, intermediate tables such as the operational status table and the ready operator number table need not to be created.

Example 1 of Screen Display

FIG. 10 is a view showing a screen display example of monitoring statuses in the manager terminal 12 according to an example of the preferred embodiment of the present invention.

As shown in FIG. 10, the screen is displayed for each menu such that a plurality of sheets are put on top of one another. Here, when a sheet tab 20 is "9. status monitoring", a status monitoring screen is displayed. The status monitoring screen is divided into two main parts by a line drawn from the top to the bottom of the screen slightly toward left of the center. A setting part for inputting and displaying setups is displayed on the left side, and a seat layout part for displaying a seat layout is displayed on the right side, respectively. Each operator's status and the like are displayed in the seat layout part in accordance with the contents which have been input in the setting part.

The table arranged to an upper portion of the setting part accepts an input of selecting a display color for each status and an input of elapsed time restriction (threshold value) from the manager. The display color can be selected from a predetermined number of colors. The elapsed time restriction (threshold value) is a time setting for issuing an alert indicating that the same status has continued for a long time. Regarding a status for which a threshold value has been set, in a case in which the elapsed time exceeds the threshold value, the display of the elapsed time is changed. For example, the font color may be changed from black to red, the font size may be increased, or the characters may be flashed, and an easily visible change is desirable.

Based on the display data received from the server 10, a time 21 for indicating operational statuses to be displayed, and a seat image 22 for displaying the statuses and the like for each operator in the respective seat positions are displayed on the seat layout part. In the display example, according to the legends of the seat image 22 arranged in a lower portion of the setting part, for example, a seat image 22a is in a "Reserved" status, a seat image 22b and a seat image 22f are in a "Talking" status, a seat image 22c and a seat image 22g are in a "Ready" status, and a seat image 22d is in a "Not Ready" status. Moreover, since a seat image 22e is in a logoff status, it is distinguished by use of a color that is further different from the display colors for indicating the statuses.

Although the seat image 22b and the seat image 22f are in the same "Talking" status, the font styles for the elapsed times are different. The reason for this is that the threshold value of "Talking", which was set in the setting part, is 10 minutes, and the elapsed time of the seat image 22f exceeds this. This enables the manager to find the seat image 22f which is recognized to have abnormality, based on the threshold value that has been set by the manager himself/herself.

In addition to the above, extension numbers (e.g., "3004" for the seat image 22b) are displayed in the seat image 22. This enables the manager to call an extension (e.g., the extension "3004" for the seat image 22b) without a particular lookup.

In this way, the manager can monitor the operational statuses of the operator terminals 13 by referring to the seat layout part in the status monitoring screen displayed on the display unit 140 of the manager terminal 12. In this way, since the manager can watch the operational statuses in the format of the visually recognizable seat layout, it is possible to quickly find an operator having a problem. As a result, the speed at which the manager copes with problems caused by the operators is increased, thereby leading to a possibility to improve the processing efficiency and the reliability in the contact center.

Returning to the description of the setting part, there is a response rate display portion around the center of the setting part. Assigned colors and response rates are correspondingly displayed to a plurality of campaigns (tasks, organizations), respectively. Here, the assigned colors have been set in advance, and an input from the user may be accepted in a separate screen. As a result, the seat images 22 are displayed in different colors for each of the set campaigns in the seat layout part.

The response rate, which is displayed by the response rate display portion, is measured by the server 10. By this display, the manager can easily grasp whether the response rate for each campaign reaches the targeted service level. For example, in a case in which the response rate of 100% is a target value, it is possible to determine that a campaign with a response rate of 98% does not have enough leeway.

Furthermore, the response rate may be displayed with a lamp image in different colors depending on the rate. Accordingly, for example, by displaying a red lamp or doing the like in a case in which the response rate is less than 80%, the manager can easily visually recognize the level of the response rate. More specifically, for example, it can be implemented by storing data beforehand for associating the range of the response rates with the colors of the lamp image.

In this way, there may be a campaign of which response rate does not reach 100%, while there may also be a campaign of which response rate is 100% and in which many operators are in a stand-by status. Since the manager can easily grasp such a situation on the screen, it is possible to issue an instruction to switch the campaign, in which the operators in the stand-by status are assigned. This makes it possible to efficiently arrange the operators even in a case in which the number of operators is limited, and to improve the response rate.

Moreover, when a selection is made, for example, by pointing a cursor 23 at the seat image 22g as one seat among the seat images 22, and clicking the mouse or doing the like, an evaluation input form screen shown in FIG. 11 or FIG. 13 to be described later is displayed as a new screen that is different from this screen.

In this way, the manager can identify an operator operating the operator terminal 13 by way of the seat image 22 while referring to the seat layout part and watching the operational statuses, thereby making it possible to extremely easily display an evaluation input form, and to immediately make an evaluation when the manager desires to make an evaluation.

Example 2 of Screen Display

FIGS. 11 to 13 are views each showing a screen display example of an evaluation input form in the manager terminal 12 according to an example of the preferred embodiment of the present invention.

FIG. 11 is a screen that is displayed on the display unit 140 of the manager terminal 12, in which data for requesting an evaluation input form has been transmitted to the server 10 by the operation at the manager terminal 12, the evaluation input form has been generated at the server 10, and has been transmitted to the manager terminal 12.

The date of the operation day, on which the evaluation input form has been requested, is automatically set in a registration target date 30. Moreover, a facial photograph of an operator, who is operating the operator terminal 13 at a seat for which an evaluation input is performed, is displayed on a facial photograph 31. Displayed thereunder are skill check items for each skill item prepared beforehand as an evaluation content portion 32 in the server 10, as well as the first-person evaluations stored in the memory unit 120 of the server 10. The first-person evaluations are extracted from an evaluation table. The manager inputs corresponding evaluations in the boss field in the evaluation column by using the manager terminal 12. This can be operated with superior operability, in which an input is enabled by only a simple operation such as pointing the cursor to an option button and clicking the mouse.

In this way, by adding information on the operator to be evaluated, the number of input items can be reduced when the manager inputs the evaluations, and only the necessary items can be appropriately displayed, thereby leading to a possibility that the management task efficiency can be increased. By utilizing and displaying the evaluation data, which is stored in the evaluation table, on the evaluation input sheet, the evaluations can be compared with the evaluations in the past, thereby leading to a possibility to facilitate performing evaluations.

FIG. 12 shows a screen in which the manager has input the evaluations in the boss fields of the evaluation input form displayed in FIG. 11. When completing the input of the evaluation items, the manager depresses a "register" button 33 arranged under the evaluation input form. As a result, the data of the input contents is transmitted to the server 10, and the evaluation contents are stored in the evaluation data table. Moreover, in a case in which the evaluation input is stopped in mid course, the manager depresses a "close" button 34, thereby terminating the processing without transmitting the evaluation data to the server 10.

In this way, the manager can make evaluations of operators by inputting from the manager terminal 12 with an easy operation, thereby leading to a possibility that the management task efficiency may be increased.

FIG. 13 is a screen that is displayed on the display unit 140 of the manager terminal 12 in a case in which an evaluation input form has been requested by the operation at the manager terminal 12 without transmitting the data to the server 10.

In the case of FIG. 13, since the communication with the server 10 is not performed, the facial photograph and the other evaluations are not displayed, but the evaluation items are displayed as in the case of FIG. 11. Accordingly, the manager can input evaluations without being misled by the other evaluations. Moreover, since the communication with the server 10 is not performed, the evaluation input sheet can be displayed in a short time.

Example 3 of Screen Display

Figure 15:
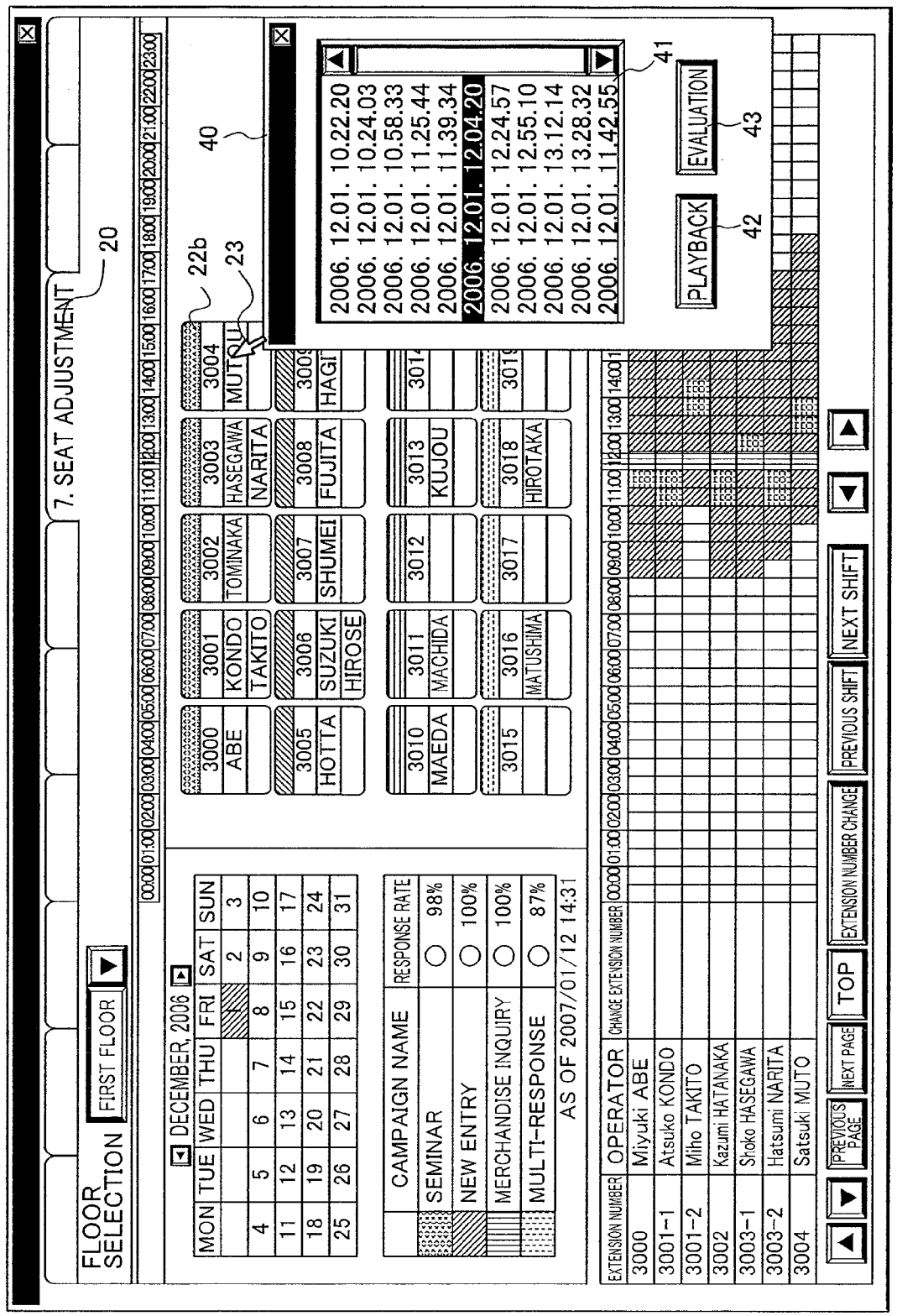
FIG. 15 shows a screen display example for past listing audio recording data in the manager terminal according to an example of the preferred embodiment of the present invention.

FIGS. 14 and 15 respectively show a screen display example for displaying a seat layout in the past and a screen display example for obtaining audio recording data in the past, in the manager terminal 12 according to an example of the preferred embodiment of the present invention. First, FIG. 14 is a screen display example for displaying a seat layout in the past.

In the screen shown in FIG. 14, the seats in the past are displayed when the sheet tab 20 is "7. seat adjustment". The seat adjustment screen is divided into three main parts: a setting part for displaying the calendar and the current response rates is displayed in the upper left portion; a seat layout part for displaying a seat layout on the date that has been selected by the calendar in the setting part is displayed in the upper right portion; and a shift displaying part for displaying working hours of the operators that have been selected by the calendar in the setting part is displayed in the lower portion, respectively. Each operator's statuses and the like are displayed in the seat layout part and the shift displaying part in accordance with the contents which have been input in the setting part.

Here, in the calendar of the setting part, the year and month can be shifted by depressing a selection button 25 or 26 arranged in the upper portion of the calendar, and an appropriate date can be selected by pointing the cursor 23 at the date. As a result, a seat layout on the corresponding date is displayed on the seat layout part, and a shift on the corresponding date is displayed on the shift displaying part.

Moreover, by depressing a select button 27 or 28 arranged in a lower portion of the shift displaying part, it is possible to select a time zone for which audio recording data is desired to be obtained. In FIG. 14, the time zone from 12:00 to 12:30 is shaded, which indicates that the time zone from 12:00 to 12:30 is selected.

Moreover, by selecting, for example, the seat image 22b as a seat among the seat images 22 displayed on the seat layout part, by pointing the cursor 23 at the seat image 22b and clicking the mouse or doing the like, a screen as shown in FIG. 15 to be described later is displayed on the screen.

FIG. 15 is a screen display example, which displays a list of the audio recording data stored in association with the seat ID on the date and time designated in FIG. 14.

Since the selection has been made by pointing the cursor 23 at the seat image 22b displayed on seat layout part and clicking the mouse or doing the like in FIG. 14, a pop-up box 40 is displayed in such a form sticking to the cursor 23 in FIG. 15. In the pop-up box 40, an audio recording data index displaying part 41 that displays the list of the date and time of the recorded data is displayed, and a playback button 42 and an evaluation button 43 are displayed thereunder. As audio recording data of the target date and time "2006/12/1, 12:00-12:30" for the seat ID "3004", as shown in FIG. 8, the audio recording data table stores audio recording data of which audio recording start date and time are "2006/12/1, 12:04:20", and audio recording data of which audio recording start date and time are "2006/12/1, 12:24:57". As a result, the two audio recording start times retrieved from the audio recording data table are displayed in the central portion of the audio recording data index displaying part 41. When selecting one out of the dates and times displayed on the audio recording data index displaying part 41, a portion indicating the date and time of the corresponding audio recording data is highlighted. In FIG. 15, the data of "2006/12/1, 12:04:20" is selected.

By depressing the playback button 42 in a state in which a pair of date and time of the data is highlighted in the audio recording data index displaying part 41, the audio recording data is downloaded and, for example, a player for playing back the audio recording data is launched. This enables the manager performing a series of operations to listen to the contents of the conversation included in the audio recording data.

Moreover, similarly, by depressing the evaluation button 43 in a state in which a pair of date and time of the data is highlighted in the audio recording data index displaying part 41, the screen of the evaluation input form as described with reference to FIGS. 11 to 13 is displayed. This enables the manager to evaluate an operator after listening to the audio recording data thereof.

Example 4 of Screen Display

Figure 16:
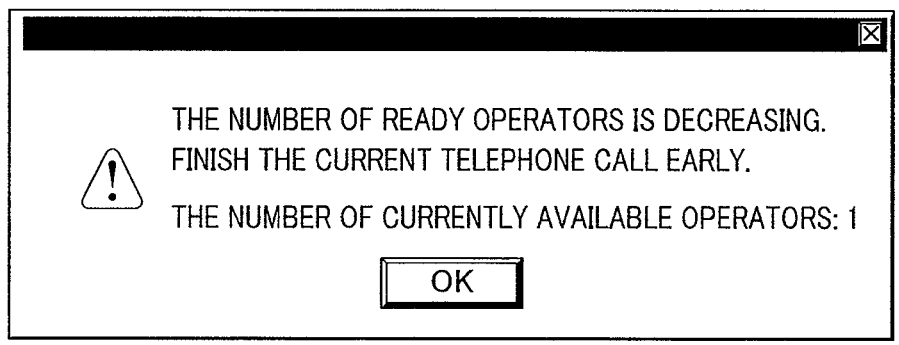
FIG. 16 shows a display example of a notice screen in the operator terminal according to an example of the preferred embodiment of the present invention.

FIG. 16 shows a display example of a notice screen in the operator terminal 13 according town example of the preferred embodiment of the present invention.

In the upper portion of the screen, a text reminder is displayed for prompting the operator to finish the current telephone call early. Moreover, in the lower portion of the screen, the number of operators currently available for responding to the customers is displayed. The number of operators available for responding can be displayed based on the data shown in FIG. 9. On the left side of the screen, an alert symbol is displayed. In the lower portion of the screen, an "OK" button is arranged, and the notice screen can be closed by depressing this "OK" button. It should be noted that, in the example shown in FIG. 16, shown is the number of operators of which task identification code is "C" in the ready operator number table shown in FIG. 9. In this case, the notice screen is equally displayed on the terminals for the operators of which the task identification code is "C".

It should be noted that the text to be displayed in the upper portion of the screen may be changed in accordance with the number of operators available for responding, by preparing a variety of patterns in the memory unit 120 of the server 10. This makes it possible to display a message, which is more suitable for the operational status, on the notice screen.

Processing Flow 1

Figure 17:
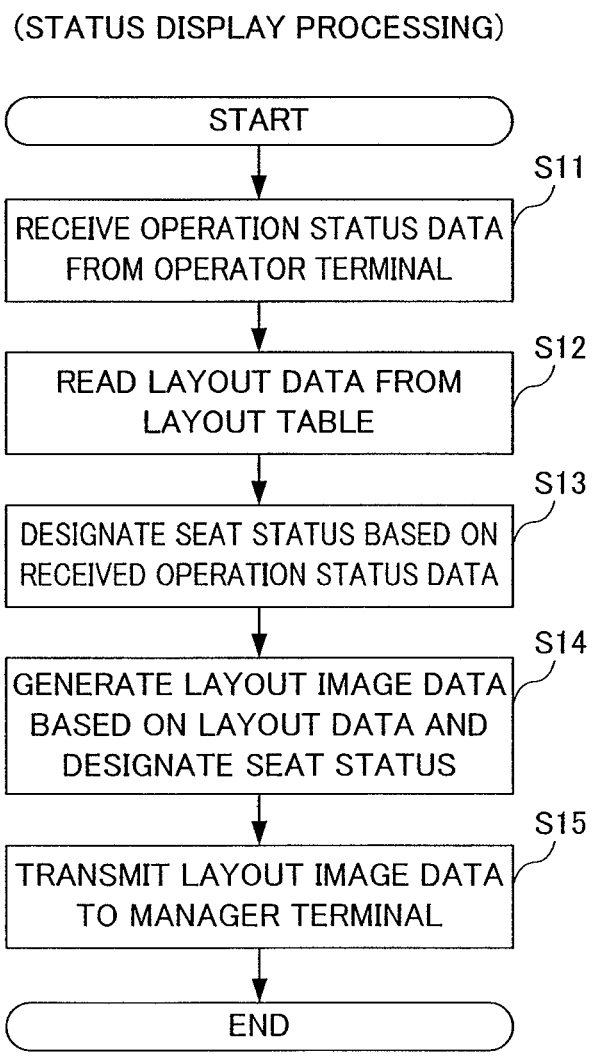
FIG. 17 is a processing flow chart that shows status display processing at the server according to an example of the preferred embodiment of the present invention.

FIG. 17 is a processing flow chart showing status display processing at the server 10 according to an example of the preferred embodiment of the present invention. The present processing is called up from a series of processing of the server 10 in FIGS. 18 and 20 to be described later.

First, in Step S11, the control unit 110 of the server 10 receives operational status data from the operator terminal 13 via the communication interface unit 150. It should be noted that, since the data is transmitted and/or received via the communication interface unit 150 in the following processing, a description thereof is omitted. The operational status data is data indicating an operational status of the operator terminal 13, in which the operator terminal 13 periodically transmits at a predetermined timing, and in addition, the operator terminal 13 transmits in response to accepting an input. Subsequently, the control unit 110 of the server 10 advances processing to Step S12.

In Step S12, the control unit 110 of the server 10 reads the latest layout data from a layout table stored in the memory unit 120 of the server 10. Subsequently, the control unit 110 of the server 10 advances processing to Step S13.

In Step S13, the control unit 110 of the server 10 designates a seat status based on the operational status data received in Step S11. More specifically, the status in the operational status table stored in the memory unit 120 of the server 10 as described in FIG. 4 is updated based on the operational status data. Subsequently, the control unit 110 of the server 10 advances processing to Step S14.

In Step S14, the control unit 110 of the server 10 generates layout image data based on the layout data read in Step S12 and the seat status designated in Step S13. More specifically, when generating the layout image data based on the layout data, the display of a status of each seat image 22 is designated based on the data in the operational status table stored in the memory unit 120 of the server 10. Subsequently, the control unit 110 of the server 10 advances processing to Step S15.

In Step S15, the control unit 110 of the server 10 transmits the layout image data, which has been generated in Step S14, to the manager terminal 12. Subsequently, the control unit 110 of the server 10 completes the present processing.

The present processing makes it possible to display the operational statuses of the operators as a seat layout image as shown in FIG. 10 on the display unit 140 of the manager terminal 12.

Processing Flow 2

Figure 18:
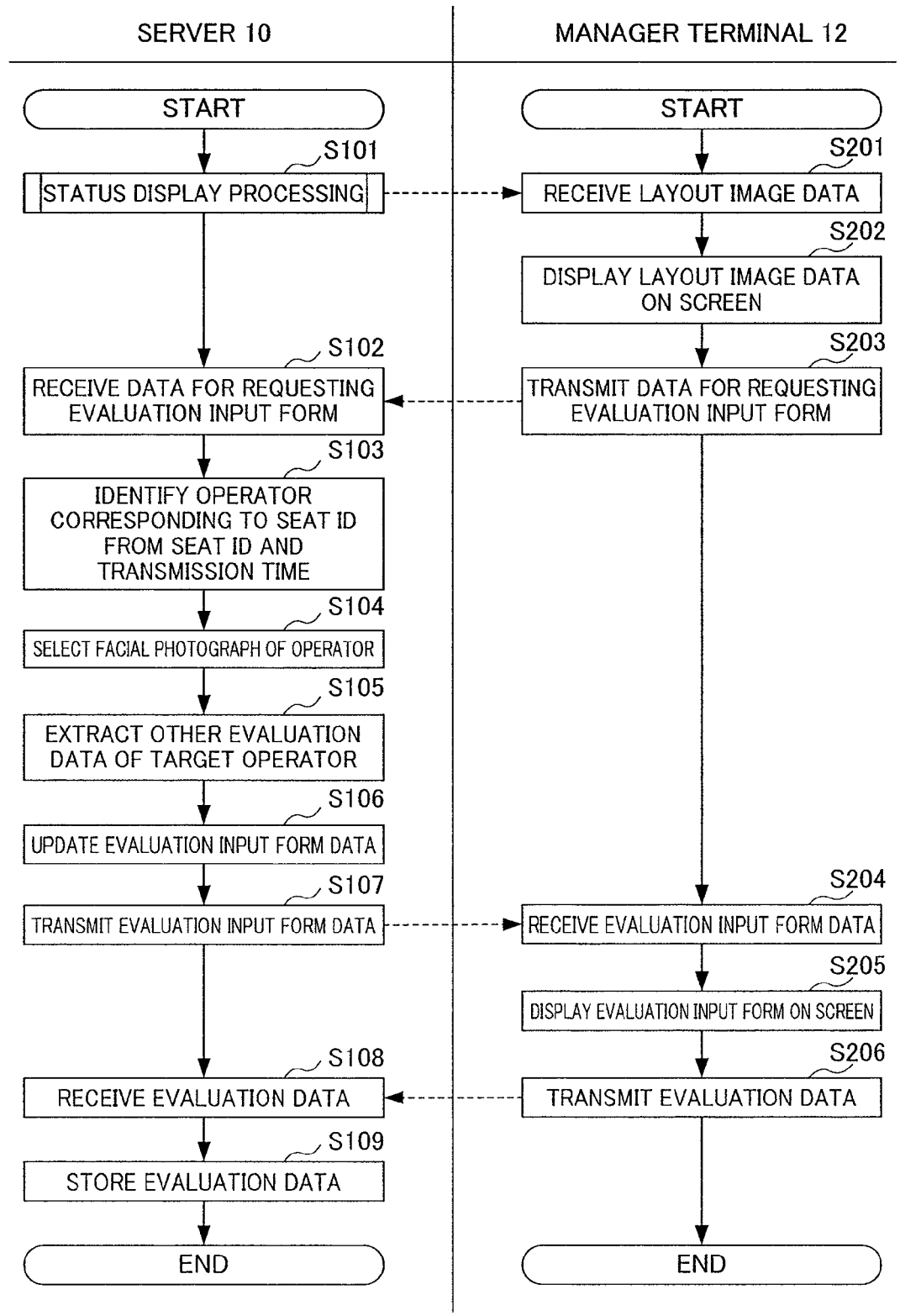
FIG. 18 is a processing flow chart that shows evaluation registration processing at the server and the manager terminal according to an example of the preferred embodiment of the present invention.

FIG. 18 is a processing flow chart showing evaluation registration processing at the server 10 and the manager terminal 12 according to an example of the preferred embodiment of the present invention. A processing flow at the server 10 is described first, and a processing flow at the manager terminal 12 is described next.

First, in Step S101, the control unit 110 of the server 10 performs the status display processing described in the aforementioned FIG. 17.

Subsequently, upon receiving data for requesting an evaluation input form from the manager terminal 12 (Step S102), the control unit 110 of the server 10 identifies an operator corresponding to the seat ID from the seat ID and the transmission time in Step S103. More specifically, the control unit 110 of the server 10 identifies an operator ID from the seat ID, the sign-on date and time and the sign-off date and time, based on the operator identification table stored in the memory unit 120 of the server 10. Subsequently, the control unit 110 of the server 10 advances processing to Step S104.

In Step S104, the control unit 110 of the server 10 selects a facial photograph of the operator. More specifically, the control unit 110 of the server 10 searches the operator table stored in the memory unit 120 of the server 10 for the operator identified in Step S103 with the operator ID as a key, and extracts the facial photograph of the corresponding operator. Subsequently, the control unit 110 of the server 10 advances processing to Step S105.

In Step S105, the control unit 110 of the server 10 extracts other evaluation data of the operator from the evaluation table stored in the memory unit 120 of the server 10. More specifically, the control unit 110 of the server 10 extracts the record of the operator ID identified by the operator identification table. The extracted record is coupled with the evaluation table, and the record of the target operator is extracted from the evaluation table. Furthermore, for example, the latest data and the first-person evaluation data are selected. Subsequently, the control unit 110 of the server 10 advances processing to Step S106.

In Step S106, the control unit 110 of the server 10 updates the evaluation input form data. More specifically, the data which has been selected and extracted in Steps S104 and S105 is inserted into the evaluation input form data stored in advance in the memory unit 120 of the server 10. Subsequently, the control unit 110 of the server 10 advances processing to Step S107.

In Step S107, the control unit 110 of the server 10 transmits the evaluation input form data, which has been updated in Step S106, to the manager terminal 12.

When the evaluation data is transmitted from the manager terminal 12, the control unit 110 of the server 10 receives the evaluation data (Step S108). Subsequently, the control unit 110 of the server 10 advances processing to Step S109.

In Step S109, the control unit 110 of the server 10 stores the evaluation data, which has been received in Step S108, in the evaluation table stored in the memory unit 120 of the server 10. Subsequently, the control unit 110 of the server 10 completes the present processing.

Next, a processing flow at the manager terminal 12 is described.

First, upon receiving the layout image data from the server 10 (Step S201), the control unit 110 of the manager terminal 12 displays the received layout image data on the screen of the display unit 140 in Step S202. Subsequently, the control unit 110 of the manager terminal 12 advances processing to Step S203.

In Step S203, the control unit 110 of the manager terminal 12 transmits data for requesting an evaluation input form to the server 10 in response to the input unit 130 of the manager terminal 12 having accepted an input of an operation for a seat image 22 in the layout image displayed on the display unit 140.

Subsequently, when the control unit 110 of the manager terminal 12 receives the evaluation input form data (Step S204), the control unit 110 of the manager terminal 12 displays an evaluation input form screen on the display unit 140 based on the received evaluation input form data in Step S205. Subsequently, the control unit 110 of the manager terminal 12 advances processing to Step S206.

In Step S206, the control unit 110 of the manager terminal 12 transmits the evaluation data to the server 10 in response to the fact that evaluations are input into the evaluation input form displayed in Step S205, and the input unit 130 of the manager terminal 12 accepts an input of a transmission operation. Subsequently, the control unit 110 of the manager terminal 12 completes the present processing.

According to the present processing, by simply designating one seat image 22, an evaluation input sheet is displayed, in which evaluations can be input while referring to a facial photograph and previously registered other evaluations of the operator to be evaluated, thereby leading to a possibility to facilitate performing evaluations.

Moreover, since the evaluation data is registered, utilization of the registered evaluation data can be useful in feeding back the evaluations of the operators.

Processing Flow 3

Figure 19:
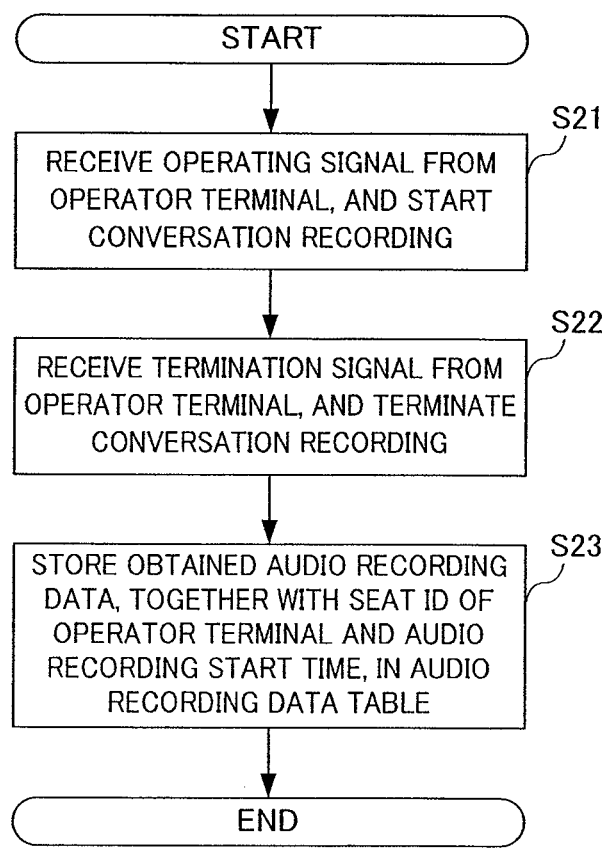
FIG. 19 is a processing flow chart that shows conversation recording processing at the server according to an example of the preferred embodiment of the present invention.

FIG. 19 is a processing flow chart showing conversation recording processing at the server 10 according to an example of the preferred embodiment of the present invention.

First, in Step S21, the control unit 110 of the server 10 starts conversation recording in response to having received an operating signal from the operator terminal 13. Here, the operating signal refers to a signal transmitted from the operator terminal 13 in a case in which an operator has picked up a telephone receiver to start responding. Subsequently, the control unit 110 of the server 10 advances processing to Step S22.

In Step S22, the control unit 110 of the server 10 terminates the conversation recording in response to having received a termination signal from the operator terminal 13. Here, the termination signal refers to a signal transmitted from the operator terminal 13 in a case in which the operator has put down the telephone receiver to terminate correspondence. Subsequently, the control unit 110 of the server 10 advances processing to Step S23.

In Step S23, the control unit 110 of the server 10 stores the obtained audio recording data, together with the seat ID of the operator terminal 13 and the audio recording start time, in the audio recording data table stored in the memory unit 120 of the server 10. Subsequently, the control unit 110 of the server 10 completes the present processing.

Processing Flow 4

Figure 20:
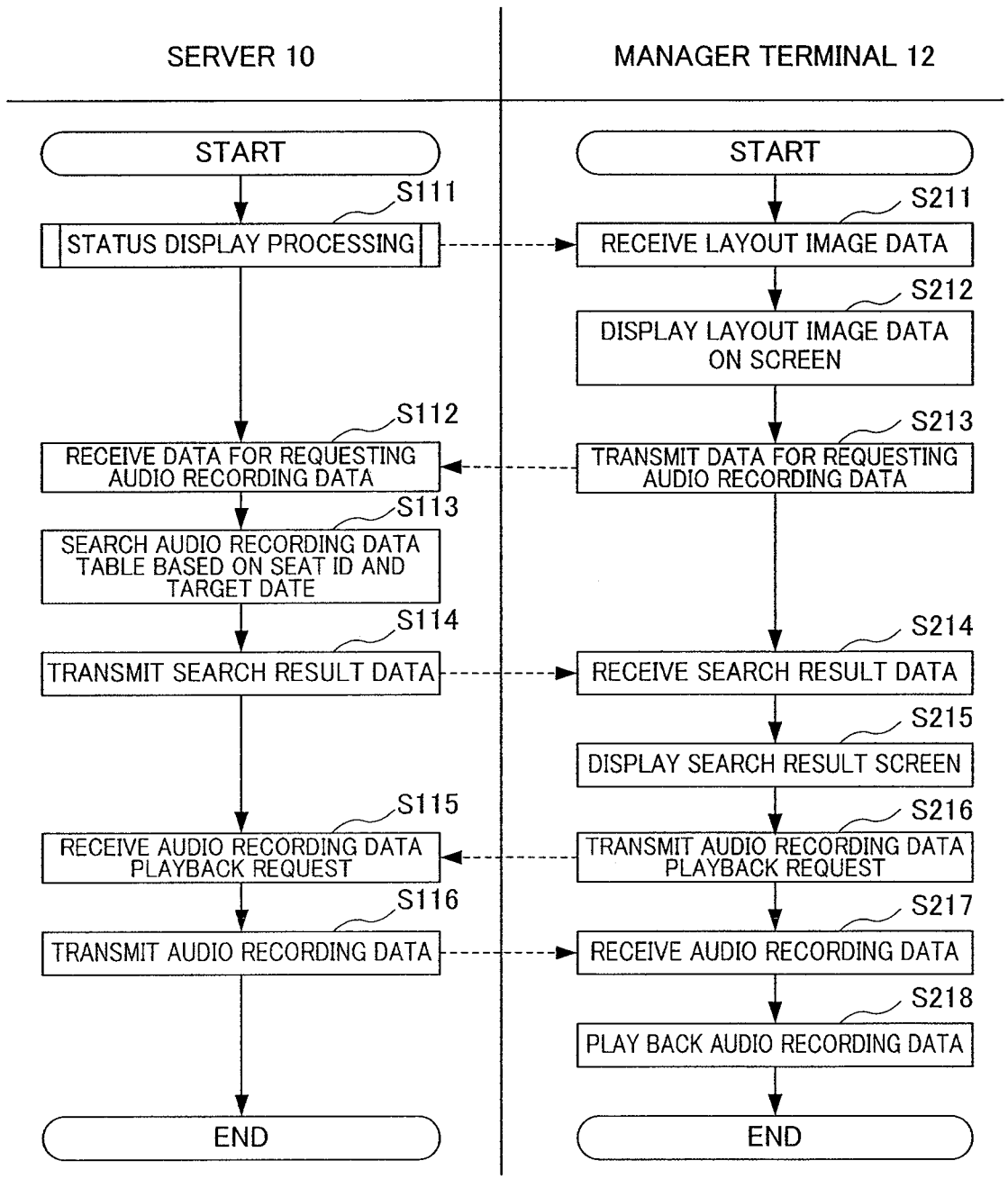
FIG. 20 is a processing flow chart that shows audio recording data playback processing at the server and the manager terminal according to an example of the preferred embodiment of the present invention.

FIG. 20 is a processing flow chart showing audio recording data playback processing at the server 10 and the manager terminal 12 according to an example of the preferred embodiment of the present invention. A processing flow at the server 10 is described first, and a processing flow at the manager terminal 12 is described next.

First, in Step S111, the control unit 110 of the server 10 performs the status display processing described in the aforementioned FIG. 17.

Subsequently, upon receiving data for requesting the audio recording data from the manager terminal 12 (Step S112), the control unit 110 of the server 10 searches the audio recording data table stored in the memory unit 120 of the server 10, based on the seat ID and the target date and time included in the data for requesting the audio recording data, in Step S113. Subsequently, the control unit 110 of the server 10 advances processing to Step S114.

In Step S114, the control unit 110 of the server 10 transmits the data as a result of the search in Step S113 to the manager terminal 12.

Subsequently, upon receiving a request for playing back the audio recording data from the manager terminal 12 (Step S115), the control unit 110 of the server 10 extracts the corresponding audio recording data stored in the memory unit 120 of the server 10, based on the seat ID and the target date and time included in the request for playing back the audio recording data, and transmits the audio recording data to the manager terminal 12, in Step S116. Subsequently, the control unit 110 of the server 10 completes the present processing.

A processing flow at the manager terminal 12 is described next.

First, upon receiving the layout image data from the server 10 (Step S211), the control unit 110 of the manager terminal 12 displays the layout image screen based on the received layout image data on the display unit 140 in Step S212. Subsequently, the control unit 110 of the manager terminal 12 advances processing to Step S213.

In Step S213, the control unit 110 of the manager terminal 12 transmits data for requesting the audio recording data to the server 10 in response to the input unit 130 of the manager terminal 12 having accepted an input of an operation for a seat image 22 in the layout image displayed on the display unit 140. The data for requesting the audio recording data refers to data including at least a seat ID of the seat image 22 and target date and time.

Subsequently, when the control unit 110 of the manager terminal 12 receives the search result data (Step S214), the control unit 110 of the manager terminal 12 displays a search result screen shown in FIG. 15 on the display unit 140 of the manager terminal 12 in Step S215. Subsequently, the control unit 110 of the manager terminal 12 advances processing to Step S216.

In Step S216, the control unit 110 of the manager terminal 12 transmits an audio recording data playback request to the server 10. More specifically, in a case in which it is desired to listen to the audio recording data on the target audio recording date and time in the screen shown in FIG. 15, the audio recording data playback request is transmitted to the server 10, by highlighting the target audio recording start time and depressing the playback button 42.

Subsequently, the control unit 110 of the manager terminal 12 receives the audio recording data (Step S217), the control unit 110 of the manager terminal 12 plays back the received audio recording data in Step S218.

It should be noted that, although the data in a file format, which is listened to by downloading the audio recording data to the manager terminal 12, is stored in the audio recording data table stored in the memory unit 120 of the server 10 in the present embodiment, any functions for listening to sound may be used. For example, the conversation contents may be listened to by playing back the audio recording data while receiving the data in a streaming format. Subsequently, the control unit 110 of the manager terminal 12 completes the present processing.

In this way, the manager can obtain conversation data including telephone call contents of an operator stored in the memory unit 120 of the server 10 by selecting a seat image 22 from the layout image displayed on the display unit 140 of the manager terminal 12. Therefore, since it is possible to obtain conversation data easily and adequately, it may be useful in coaching the operators.

Processing Flow 5

Figure 21:
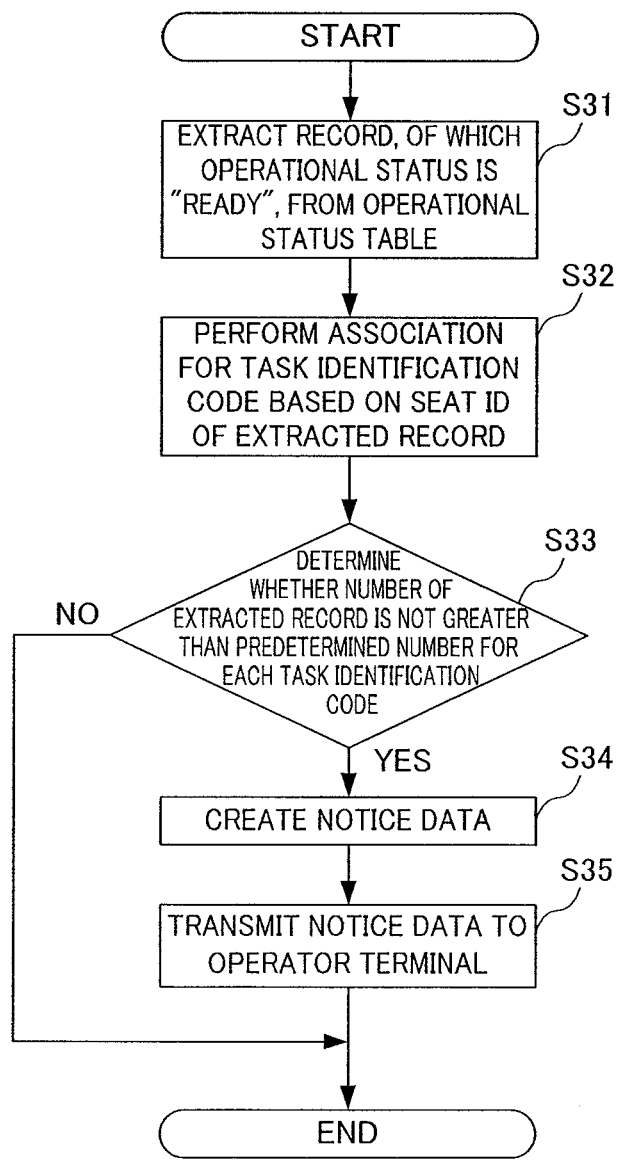
FIG. 21 is a processing flow chart that shows notice processing at the server according to an example of the preferred embodiment of the present invention.

FIG. 21 is a processing flow chart showing notice processing at the server 10 according to an example of the preferred embodiment of the present invention. The present processing is performed periodically, for example, on a minute-by-minute basis, by the server 10.

First, in Step S31, the control unit 110 of the server 10 extracts records, of which the operational status is "ready", from the operational status table stored in the memory unit 120 of the server 10. More specifically, the records, of which the status in the operational status table is "2", are extracted. Subsequently, the control unit 110 of the server 10 advances processing to Step S32.

In Step S32, the control unit 110 of the server 10 performs association for the task identification codes based on the seat IDs of the records that have been extracted in Step S31. More specifically, the task identification codes, which are stored in association with the seat IDs of the latest layout data, are extracted by using the layout table stored in the memory unit 120 of the server 10, and are associated with the operational status records. Still more specifically, the ready operator number table, which is stored in the memory unit 120 of the server 10, as shown in FIG. 9, may be created. Subsequently, the control unit 110 of the server 10 advances processing to Step S33.

In Step S33, the control unit 110 of the server 10 determines whether the number of the records that have been extracted in Step S32 is not greater than a predetermined number for each task identification code. In a case in which the number is not greater than the predetermined number (in a case in which the determination is YES in the processing in Step S33), the control unit 110 of the server 10 advances processing to Step S34. On the other hand, in a case in which the number is greater than the predetermined number (in a case in which the determination is NO in the processing in Step S33), the control unit 110 of the server 10 completes the present processing.

In Step S34, the control unit 110 of the server 10 creates notice data. More specifically, the data to be displayed on the screen shown in FIG. 16 is created. Subsequently, the control unit 110 of the server 10 advances processing to Step S35.

In Step S35, the control unit 110 of the server 10 transmits the notice data created in Step S34 to the operator terminal 13. Subsequently, the control unit 110 of the server 10 completes the present processing.

In this way, the can watch the notice display that describes the notice contents and the number of ready operators, which may provide an opportunity to perform a rapid response such as finishing the current telephone call early.

The processing as thus far described is performed by reading a program stored in the memory unit 120 of each of the server 10 and the manager terminal 12. Here, the program to be executed at the manager terminal 12 may be stored in the memory unit 120 of the manager terminal 12 in advance, but may be configured, for example, to be received from the server 10 by the manager terminal 12 accessing the server 10 by using conventional Web application techniques and the like.

As a result, the dedicated program according to the present invention is stored in the server 10, and thus the manager terminal 12 may be a general computer terminal that includes a Web browser and the like. Therefore, it is easy to perform exchanging and the like of the manager terminal 12.

Although an embodiment of the present invention has been described above, the present invention is not limited to the aforementioned embodiment. Moreover, the effects described in the embodiment of the present invention merely list the most preferable effects that arise from the present invention, and the effects according to the present invention are not limited to those described in the embodiment of the present invention.

The invention claimed is:

1. A server in combination with a manager terminal, the server connected via a communication line to operator terminals including a telephone function and the manager terminal including a display unit in a contact center, the server comprising:
    a memory unit configured to store:
        an operator identification table for storing data that enables identification of operators operating the operator terminals on an hourly basis by associating seat IDs uniquely indicating the operator terminals and operator IDs identifying the operators operating the operator terminals; and
        a layout table for storing layout data that indicates layout locations of the operator terminals based on the seat IDs, and for storing task identification data that corresponds to a task associated with the seat ID;
    a unit configured to receive operational status data, which is transmitted from the operator terminals, and which indicates operational statuses of the operator terminals, together with the seat IDs;
    a unit configured to read the layout data from the layout table;
    a unit configured to generate display data based on the seat IDs from the read layout data to display a seat layout image indicating operational statuses that are different depending on types of the received operational status data, and to transmit the display data to the manager terminal; and
    a unit configured to selectively transmit notice data to the operator terminals based on a determination of a number of operator terminals having, in the layout table, task identification data that corresponds to a task to a threshold,
    wherein the manager terminal comprises a listing of audio recording data, the audio recording data comprising conversation contents which have been recorded, with a "seat ID" and a "audio recording start date and time" as keys,
    wherein the unit configured to selectively transmit notice data to the operator terminals is further configured to transmit the notice data only to the operator terminals having, in the layout table, task identification data that corresponds to the task and having the operational status that does not indicate readiness to accept the task when the number of operator terminals having, in the layout table, task identification data that corresponds to the task and having an operational status that indicates readiness to accept the task is not greater than the threshold, and
    wherein the notice data directs an operator terminal to terminate the task.

2. The server according to claim 1, further comprising:
    a unit configured to receive, from the manager terminal, evaluation data of an operator operating one operator terminal, which has been input by a manager into an evaluation input form displayed on the display unit of the manager terminal, together with the seat ID indicating the one operator terminal, in response to the manager terminal having accepted a selection of the one operator terminal among the operator terminals displayed as the seat layout image on the display unit of the manager terminal, together with designation of time; and
    a unit configured to store the received evaluation data into the memory unit by associating with the received seat IDs.

3. The server according to claim 1, further comprising:
    a unit configured to transmit, to the manager terminal, data of an evaluation input form for inputting evaluation data of an operator operating one operator terminal based on the seat ID indicating the one operator terminal, which has been transmitted in response to the manager terminal having accepted a selection of the one operator terminal among the operator terminals displayed as the seat layout image on the display unit of the manager terminal, together with designation of time;
    a unit configured to receive, from the manager terminal, the evaluation data of the operator operating the one operator terminal, which has been input by a manager into the evaluation input form displayed on the display unit of the manager terminal, together with the seat ID indicating the one operator terminal, in response to the manager terminal having received the data of the evaluation input form; and
    a unit configured to store the received evaluation data into the memory unit by associating with the received seat IDs.

4. The server according to claim 3, wherein the unit configured to transmit the data of the evaluation input form transmits the data of the evaluation input form, together with other evaluation data, which is stored in advance in the memory unit in association with the seat ID, of the operator operating the one operator terminal, to the manager terminal.

5. The server according to claim 3, wherein the unit configured to transmit the data of the evaluation input form transmits the data of the evaluation input form, together with image data of the operator operating the one operator terminal, based on the seat ID, to the manager terminal.

6. The server according to claim 3, wherein the data of the evaluation input form is data configured so as to enable inputting thereof by accepting a selection of predetermined input items.

7. The server according to claim 1, wherein the types of the operational status data include a type for determining whether the operator terminals are at least operating.

8. The server according to claim 1, wherein the operational status data transmitted from the operator terminal is received in response to the operator terminal having accepted an operation from the operator.

9. The server according to claim 1, wherein the operational status data transmitted from the operator terminal is received, provided that the operator terminal does not accept an operation from the operator within a predetermined time.

10. The server according to claim 1, further comprising:
    a unit configured to store, in the memory unit, conversation data including telephone call contents of the operator operating the operator terminal indicated by the seat ID received from the operator terminal, in association with the received seat ID; and a unit configured to extract the conversation data of the operator operating one operator terminal from the memory unit and to transmit the conversation data to the manager terminal, based on a seat ID indicating the one operator terminal, which has been transmitted in response to the manager terminal having accepted a selection of the one operator terminal among the operator terminals displayed as the seat layout image on the display unit of the manager terminal, together with designation of time.

11. The server according to claim 1, wherein the unit configured to selectively transmit the notice data transmits data indicating a number of ready operators who can accept the task.

12. A system comprising a manager terminal which is connected via a communication line to a server communicably connected to operator terminals having a telephone function in a contact center, and which includes a display unit, the system comprising:
on the manager terminal, a unit configured to receive display data, which is transmitted from the server, to display a seat layout image showing operational statuses that are different depending on types of operational status data indicating operational statuses of the operator terminals;
on the manager terminal, a unit configured to display the seat layout image on the display unit based on the received display data;
on the manager terminal, a unit configured to store a listing of audio recording data, the audio recording data comprising conversation contents which have been recorded, with a "seat ID" and a "audio recording start date and time" as keys; and
on the server, a unit configured to selectively transmit notice data to the operator terminals based on a determination of a number of operator terminals assigned to a task to a threshold,
wherein the unit configured to selectively transmit notice data to the operator terminals is further configured to transmit the notice data only to the operator terminals assigned to the task when the number of operator terminals not assigned to the task and having an operational status that indicates readiness to accept the task is not greater than the threshold, and
wherein the notice data directs an operator terminal to terminate the task.

13. The system according to claim 12, further comprising:
a unit configured to display, on the display unit, an evaluation input form for inputting evaluation data of an operator operating one operator terminal in response to having accepted a selection of the one operator terminal among the operator terminals displayed as the seat layout image on the display unit, together with designation of time;
a unit configured to accept an input of the evaluation of the operator by a manager operating the manager terminal; and
a unit configured to transmit evaluation data showing the accepted evaluation of the operator, together with a seat ID indicating the one operator terminal, to the server.

14. The system according to claim 12, further comprising:
a unit configured to transmit, together with a seat ID indicating one operator terminal, data for requesting an evaluation input form for inputting evaluation data of an operator operating the one operator terminal in response to having accepted a selection of the one operator terminal among the operator terminals displayed as the seat layout image on the display unit, together with designation of time;
a unit configured to receive data of the evaluation input form transmitted from the server;
a unit configured to display the evaluation input form on a display unit, based on the data of the received evaluation input form;
a unit configured to accept an input of the evaluation of the operator by a manager operating the manager terminal; and
a unit configured to transmit evaluation data showing the accepted evaluation of the operator, together with a seat ID indicating the one operator terminal, to the server.

15. The system according to claim 14, wherein the unit configured to receive the data of the evaluation input form receives the data of the evaluation input form, together with other evaluation data, which is stored in advance in the memory unit in association with the seat ID, of the operator operating the one operator terminal, from the server.

16. The system according to claim 14, wherein the unit configured to receive the data of the evaluation input form receives the data of the evaluation input form, together with image data of the operator operating the one operator terminal based on the seat ID, from the server.

17. The system according to claim 13, wherein the evaluation input form is configured so as to enable inputting by accepting a selection of predetermined input items.

18. The system according to claim 13, wherein the evaluation input form is displayed on the display unit as a screen that is different from a screen displaying statuses of operators operating the operator terminals displayed on the display unit as a seat layout image.

19. A system, for a contact center, including operator terminals including a telephone function, a manager terminal including a display unit, and a server connected via a communication line to the operator terminals and the manager terminal, the system comprising:
on the server, a memory unit including an operator identification table for storing data that enables identification of operators operating the operator terminals on an hourly basis by associating seat IDs uniquely indicating the operator terminals and operator IDs identifying the operators operating the operator terminals, and a layout table for storing layout data that indicates layout locations of the operator terminals based on the seat IDs and for storing task identification data that corresponds to a task associated with the seat ID;
a unit configured to transmit, by the operator terminals, operational status data indicating operational statuses of the operator terminals, together with the seat IDs;
a unit configured to receive the operational status data, by the server;
a unit configured to read the layout data from the layout table, by the server;
a unit configured to generate, by the server, display data based on the seat IDs from the read layout data to display a seat layout image indicating operational statuses that are different depending on types of the received operational status data, and transmitting the display data to the manager terminal;
a unit configured to receive the display data, by the manager terminal; and
a unit configured to display, by the manager terminal, the seat layout image on the display unit based on the display data; and on the server, a unit configured to selectively transmit notice data to the operator terminals based on a determination of a number of operator terminals having, in the layout table, task identification data that corresponds to a task to a threshold, wherein the manager terminal comprises a listing of audio recording data, the audio recording data comprising conversation contents which have been recorded, with a "seat ID" and a "audio recording start date and time" as keys, wherein the unit configured to selectively transmit notice data to the operator terminals is further configured to transmit the notice data only to the operator terminals having, in the layout table, task identification data that corresponds to the task and having the operational status that does not indicate readiness to accept the task when the number of operator terminals having, in the layout table, task identification data that corresponds to the task and having an operational status that indicates readiness to accept the task is not greater than the threshold, and wherein the notice data directs an operator terminal to terminate the task.

* * * * *

UNITED STATES PATENT AND TRADEMARK OFFICE
CERTIFICATE OF CORRECTION

PATENT NO. : 8,869,057 B2
APPLICATION NO. : 12/524853
DATED : October 21, 2014
INVENTOR(S) : Toshiyuki Omiya It is certified that error appears in the above-identified patent and that said Letters Patent is hereby corrected as shown below:

In the Specification

In column 1 at line 40, change "feed back" to --feedback--.

In column 24 at line 58, change "the can" to --the operators can--.

Signed and Sealed this
Nineteenth Day of May, 2015

Michelle K. Lee
*Director of the United States Patent and Trademark Office*